US012587804B2

(12) United States Patent
Jukic et al.

(10) Patent No.: US 12,587,804 B2
(45) Date of Patent: Mar. 24, 2026

(54) LOCATION-AWARE NEURAL AUDIO PROCESSING IN CONTENT GENERATION SYSTEMS AND APPLICATIONS

(71) Applicant: Nvidia Corporation, Santa Clara, CA (US)

(72) Inventors: Ante Jukic, Culver City, CA (US); Jagadeesh Balam, Campbell, CA (US); Boris Ginsburg, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 256 days.

(21) Appl. No.: 18/347,046

(22) Filed: Jul. 5, 2023

(65) Prior Publication Data

US 2025/0016517 A1 Jan. 9, 2025

(51) Int. Cl.
*H04S 7/00* (2006.01)
*G10L 25/30* (2013.01)

(52) U.S. Cl.
CPC .............. *H04S 7/302* (2013.01); *G10L 25/30* (2013.01); *H04S 7/305* (2013.01)

(58) Field of Classification Search
None
See application file for complete search history.

(56) References Cited

U.S. PATENT DOCUMENTS 10,573,301 B2 * 2/2020 Kupryjanow ....... G10L 21/0232
10,649,060 B2 * 5/2020 Venalainen ............ H04R 3/005
10,856,076 B2 * 12/2020 Chen ................... G10L 21/0272
11,315,587 B2 * 4/2022 Defraene ............... G06N 3/044
11,508,388 B1 * 11/2022 Souden .................... G06N 3/08
11,696,079 B2 * 7/2023 Jelčicová et al. .... H04R 25/407 381/317
12,010,490 B1 * 6/2024 Delikaris Manias ... H04S 7/303
12,067,970 B2 * 8/2024 Ge .......................... G10L 15/20
2020/0202867 A1 * 6/2020 Zhang ..................... G10L 17/18
2022/0369031 A1 * 11/2022 Lester ................... G10L 21/028
2023/0077816 A1 * 3/2023 Du .......................... G06N 3/08 704/200
2023/0352040 A1 * 11/2023 Lester ................... G10L 21/028
2023/0388737 A1 * 11/2023 Law ........................ H04S 3/008

* cited by examiner

*Primary Examiner* — Paul W Huber
(74) *Attorney, Agent, or Firm* — Hogan Lovells US LLP

(57) ABSTRACT

Approaches presented herein provide for identification of sound from a sound source relative to an array of microphones of a potentially unknown configuration using, in part, differences in the audio signals received by the microphones. In at least one embodiment, audio signals are captured using an array of microphones and audio features are extracted from those signals. The audio features can be processed using a first neural network to generate a feature vector representing a spatial location of an audio source with respect to the plurality of microphones, where the spatial location is inferred based on audio differences and independent of an availability of information indicating a physical configuration of the plurality of microphones. The feature vector can be provided to a task-specific model to perform at least one audio-related task based in part on the spatial location.

20 Claims, 18 Drawing Sheets

LOCATION-AWARE NEURAL AUDIO PROCESSING IN CONTENT GENERATION SYSTEMS AND APPLICATIONS

BACKGROUND

In many applications—such as for video conferencing or voice recording, for example—there can be a desire to improve the quality of captured audio data. This can include, for example, the extraction, enhancement, and/or suppression of audio from specific sources or directions. During a video conference, this may involve extracting or enhancing audio corresponding to speech uttered by a person speaking from a specific location or region, such as a region in front of a computer or podium used by that person for the video conference, as well as suppressing noise or audio from other sources or locations around that computer or away from the podium, such as background noise that might be captured from other directions. In scenarios where multiple microphones are used to capture audio signals, it is possible to exploit spatial information to extract, enhance, and/or suppress audio signals originating from different directions, regions, or locations. This may be performed, for example, by focusing on signals from a particular direction, or range of directions. One approach is to exploit direction and/or distance estimation or a steering vector that is determined relative to a fixed microphone array with a known configuration. Estimating a direction of arrival of an audio signal requires knowledge of a geometry of the microphone array, however, which can limit the use of such an approach for situations where a random microphone configuration may be used or where microphones (or other devices capable of capturing audio signals) may be rearranged. When a random set of microphones is not properly calibrated and is placed in an unknown configuration, the direction of arrival of signals from an audio source that are captured by those microphones can be unknown, or at least uncertain, which can impact the ability to extract, enhance, and/or suppress audio from these unknown directions.

BRIEF DESCRIPTION OF THE DRAWINGS

Various embodiments in accordance with the present disclosure will be described with reference to the drawings, in which.

DETAILED DESCRIPTION

Figure 1:
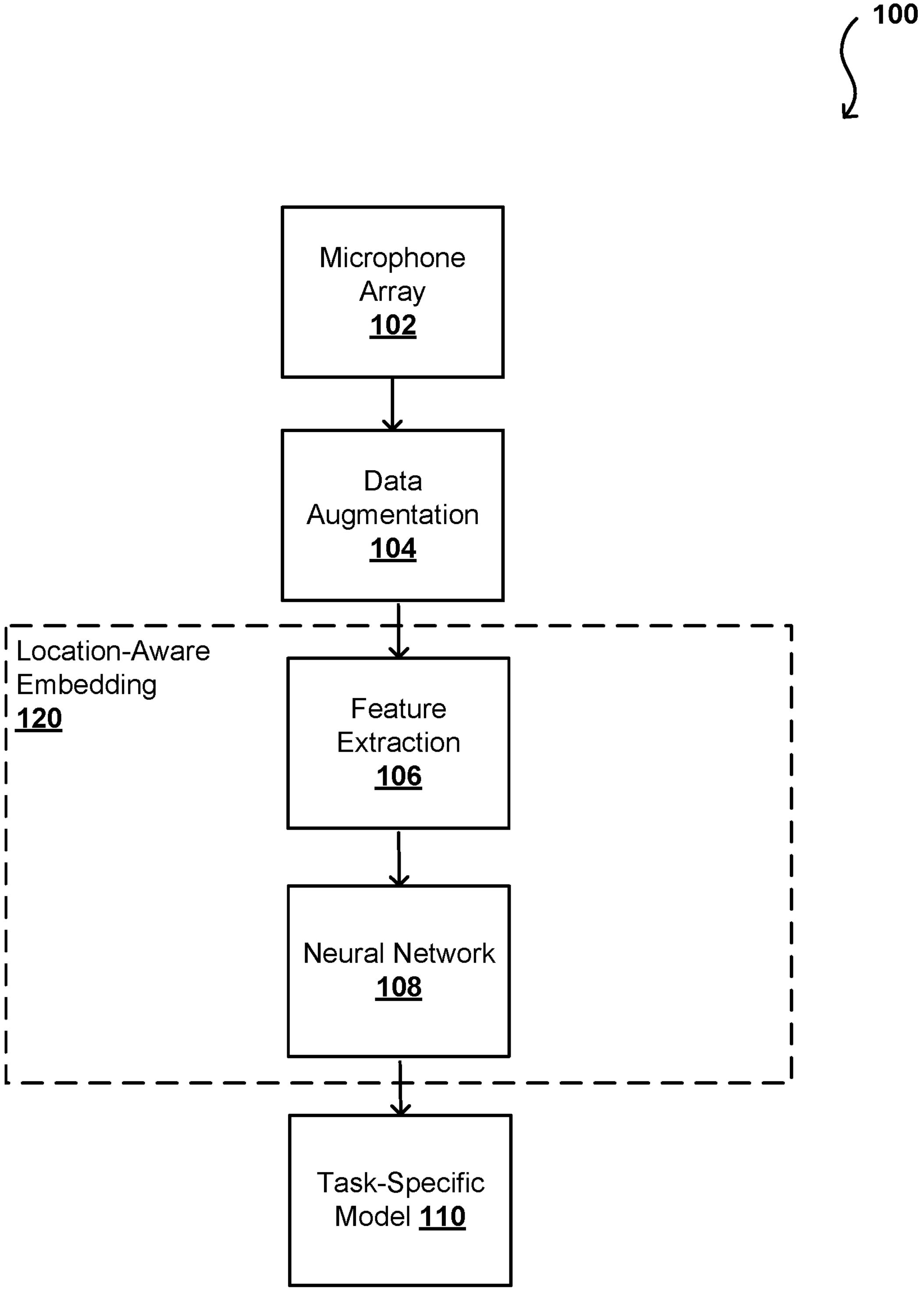
FIG. 1 illustrates an example system for performing location-aware neural audio processing, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

The systems and methods described herein may be used by, without limitation, non-autonomous vehicles or machines, semi-autonomous or autonomous vehicles or machines (e.g., in one or more advanced driver assistance systems (ADAS), one or more in-vehicle infotainment systems, one or more emergency vehicle detection systems), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, and/or any other suitable applications.

Disclosed embodiments may be comprised in a variety of different systems such as automotive systems (e.g., an in-vehicle infotainment system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models—such as large language models (LLMs), systems for performing light transport simulation, systems for performing collaborative content creation for 3D assets, systems implemented at least partially using cloud computing resources, and/or other types of systems.

Approaches in accordance with various illustrative embodiments provide for location-aware content processing, independent of knowledge of the location or configuration of devices used to capture or obtain that content, or the location of sources of that content. In at least one embodiment, one or more neural networks (NNs) can be trained (using captured and/or simulated training data) to infer location-related embeddings or feature vectors associated with at least one sound source. The neural embeddings can be estimated for various physical configurations of microphones, for example, as may involve three or more microphones to allow for accurate direction or location inference. The physical configurations may include various configuration of different numbers of microphones, different relative placements of the microphones, varying noise and reverberations in the microphones, and other related aspects. One or more neural networks, or other machine learning models, can also be trained to produce inferences for one or more location-aware (or at least partially location-dependent) tasks, such as audio source location determinations useful for audio extraction, enhancement, and/or suppression, among other such tasks. An example neural network can use cross-channel features, temporal features, and/or spectral features to generate embeddings or feature vectors that encode information associated with a location (or direction or region, etc.) of at least one sound source relative to individual microphones of the microphone array. Once generated, these embeddings or feature vectors can be used to enhance, extract, and/or suppress audio from inferred locations, distances, and/or directions with respect to one or more unknown microphone configurations, thereby offering robustness in allowing a task-specific model to be performed using location-aware neural audio processing, without receiving specific location or direction information determinable using a known microphone arrangement.

In at least one embodiment, systems and methods for location-aware neural audio processing can involve receiving audio signals captured using an array (or other set or collection) of microphones and extracting (or encoding) audio features from the audio signals. The audio features may be related to aspects allowing derivation of the aforementioned cross-channel features, temporal features, and spectral features. The audio features may be processed using at least one neural network to generate, independent of, in some embodiments, an availability of information indicating the physical configuration of the array of microphones, a feature vector representing a spatial location of a sound source with respect to the array of microphones. A generated feature vector may be provided to a task-specific model to perform at least one audio-related task, such as to extract speech corresponding to the spatial location, perform echo cancellation, enhance audio received from an inferred spatial location associated with a sound source, and/or suppress audio received from locations other than a spatial location associated with the sound source, among other such options.

In at least one embodiment, enhancement of audio may be performed for location-informed speech enhancement if an utterance is available from (or for) a particular position. For example, embeddings or feature vectors can include features useful to determine location-relevant information corresponding to an utterance. The location-relevant information can be provided as input to a speech enhancement system to extract speech from one position of a multi-channel audio signal including different sounds from different positions. Since the configuration of the microphones may not be known, the position-relevant information may not relate to an actual position, region, or direction, but may identify features or aspects useful in identifying sound generated from a specific region, such that sound inferred to be from that same region may be enhanced and sound inferred to be outside that region to be suppressed for speech enhancement or other such tasks. For example, the timing at which sound from a source is received by microphones at different positions will be similar, such that the relative timing can be used to identify sound from a location of that source and distinguish from other sounds at other locations that will have different relative timing information. Such an approach may be used in operations such as in-car communication, where a goal may be to separately extract speech of different persons inside the vehicle, or enhance speech from a person in a specific location, such as in a driver's seat. In one example, speech may be separated by the sound source, including from a front left, a front right, a rear left, and a rear right position. A system in accordance with at least one embodiment can identify and extract speech (or other audio—such as singing or clapping) corresponding to these distinct locations inside the vehicle, irrespective of identities of the sound sources in those positions—even though the system may not be able to accurately identify which sound corresponds to which position. The system may be able to correlate sound that comes from the driver seat location, without knowing that the location corresponds to the driver seat, and not a different location in the vehicle. Such an approach is beneficial for scenarios like ridesharing or when passengers cannot (and may need not) be identified. There may be different positions of sound sources and microphones in different car models and other physical configurations may change; however, a system as described herein can provide robustness towards different and/or unknown microphone placements and array geometries by using location-aware neural embeddings to associate sound from specific positions or directions that may be associated with specific sound sources. In at least one embodiment, sound sources may be recorded at a factory or other service location and may be used during training or calibrating of such systems. Alternatively, location-aware enrollment may be performed during single-speaker activity, with other sensors in the vehicle (including a camera) being used to confirm a current location of the speaker, among other such options.

In at least one embodiment, such approaches may also be used to suppress one or more sound sources, whether from a certain direction of outside a range of directions of specific sound sources. When activity of such an undesired sound source is detected or recorded, a system can extract information from the audio signal, independent of, in some embodiments, an availability of location information indicating a physical configuration of the plurality of microphones. This information can be used in an audio processing system to infer direction, distance, and/or location, and then suppress a signal corresponding to that direction, distance, or location. In one example operation, such an approach allows for playback suppression, with microphones placed in an environment having a loudspeaker or a television playing content, and with selective sources that are outside of the loudspeaker or the television being suppressed.

A system to perform location-aware neural audio processing in accordance with at least one embodiment can use neural embeddings or feature vectors to encode location-related information of a sound source instead of, for example, geometric information. The neural embeddings or feature vectors can be used to generalize the estimation processes of a direction or location of an audio signal, which would otherwise be defined only with the microphone positions being known in advance. Further, such neural embeddings or feature vectors can be used to generalize an estimation process of a steering vector. A steering vector can be based on a signal propagation model that is estimated by eigenvalue decomposition of a covariance matrix that assumes little to no reverberation in the environment. However, such an assumption may have limits in scenarios when microphones are placed at a distance. The robustness in the use of neural embeddings or feature vectors by the location-aware neural audio processing in accordance with at least one embodiment can address these limitations by the aforementioned generalizations that are not based on informed positions and distances at the time of utterance.

Variations of this and other such functionality can be used as well within the scope of the various embodiments as would be apparent to one of ordinary skill in the art in light of the teachings and suggestions contained herein.

Approaches in accordance with various illustrative embodiments provide for an efficient and accurate content generation, modification, and/or enhancement process. FIG. 1 illustrates an example system 100 for performing location-aware neural audio processing, according to at least one embodiment. In this example, a microphone array 102, or collection of typically three or more microphones or audio capture devices, may be provided whose relative positions or orientations may not be known. Audio data corresponding to audio signals captured by the microphones of the array 102 may be provided to a data augmentation module 104. The data augmentation module 104 is able to augment, modify, or enhance the audio signals received. When the audio data is to be used as training data, the augmentation can attempt to include data for different conditions associated with the captured audio signals. In at least one embodiment, such augmentation can help to increase the robustness of the audio data processed for a given environment. In at least one embodiment, the data augmentation module 104 may include, or be used with, memory for storing instructions and a processing component with ability to execute those instructions, to simulate as many different conditions as possible with the audio signals received.

In one example, the microphones of the array 102 can be a simulated arrangement of microphones to provide audio signals that may be subject to channel permutation and channel dropout. A data augmentation module 104 can permute channels associated with the audio signals to expose the system 100 to additional configurations and different configurations. Similarly, the data augmentation module 104 can perform channel dropout, in which only audio signals from select ones of the microphones may be used (and others not used) based in part on an environment. This can be performed to simulate specific physical configurations, such as availability of microphones in an environment. In another example, the data augmentation module 104 can simulate zeros in some channels associated with the audio signals, to support the channel dropout simulation. In yet another example, different amounts and types of noise (or other audio and speech) may be incorporated into the audio signals, to simulate different physical environments.

An output of a data augmentation module 104 may be provided to a location-aware embedding process or module 120 that may include a feature extraction module 106 and a neural network (NN) 108 (or NN-based inferencing module). In at least one example, a location-aware embedding module 120 is associated with memory having instructions and processing capabilities, based in part on executing those instructions, to perform multiple modules, including feature extraction, training, and/or testing of one or more neural networks. Separately, dedicated processing or execution unit capabilities allow individual modules for feature extraction, training, and testing of one or more neural networks without a need to execute the instructions from memory.

In at least one embodiment, a feature extraction module 106 of the location-aware embedding module 120 is able to extract features from the audio data captured by the individual microphones of the array 102 without knowing a physical configuration of the multiple microphones. At least one NN of the neural network module can be trained to discriminate audio corresponding to different locations, directions, and/or positions of one or more sound sources with respect to the microphones of the array 102 without any actual information about a physical direction, distance, and/or configuration of the multiple microphones of the array 102 being explicitly provided. It should be understood, however, that such approaches may be applied as well in systems where there may be some information known, such as direction or orientation of one or more microphones of an array, but not all information is available such that traditional approaches would still be unusable or at least potentially unreliable.

In one example, it is not necessary to determine an azimuth direction with respect to a microphone array. Instead, a feature extraction module 106 can extract audio features that can be provided to a trained NN to infer a spatial location of a sound source, where the physical location may be unknown but it can be determined that the sound can from a same relative location or direction as an earlier detected sound based on the extracted audio feature information. In an operation relating to a smart speaker, for example, instead of an azimuth (or other physical angle) being estimated from an utterance, an embedding or feature vector may be used to determine closeness to a specific location of the source of the utterance from which information is to be extracted, even if the location in the physical world is unknown.

A neural network of the location-aware embedding process 120 herein can be trained to perform inferencing based on a varying number of input channels, and can therefore support inter-channel phase differences 106C as a feature, such as is illustrated for the system 200 of FIG. 2. For example, there may be four or more channels and each channel may include real and imaginary components 106A of the complex spectrum in the audio signals provided from the microphones of the array 102. The real and imaginary components 106A may be treated as further features, apart from magnitude and phase 106B, level and time of arrival, and/or other aspects or features of such audio signals. Further, the reference to an NN generally encompasses one or more NNs working towards a common goal to provide location-aware neural audio processing. A neural network can be trained to support feature inputs having averaging and attention across channels. A channel can be used interchangeable with data associated with the channel that may be from one or more microphones of the array 102. The channel can provide part of a feature for the NN during training. A channel attention can be reflective of meaningful aspects associated with a provided training input, such as an audio feature of the audio signals. The attention may be related to spatial aspects in the audio features, in at least one embodiment.

One or more of such features 106A-C may be interleaved with, for example, temporal features and spectral features. Further, spatial features may be encoded using a power or amplitude of the audio signals received with respect to at least a time point over the physical configurations of the microphones capturing the audio data. As such, a four-channel input provided for the feature extraction module 106 can generate a four-channel output of associated features, which may be provided to the NN. The NN may include multiple training layers such as a channel processing layer, an inter-channel processing layer, a spectral processing layer, and a temporal processing layer, such as will be discussed in more detail with respect to FIG. 3.

In at least one embodiment, one or more features may correspond to spectrograms of the audio signals. For example, a short-time Fourier transform (STFT) may be associated with a magnitude and phase of each of the channels of the audio signals. One or more of the magnitude and phase may also include complex-valued features having the different channels to represent real and imaginary parts of the audio signals. In at least one embodiment, the magnitude and phase may be processed differently than the real and imaginary parts of the audio signals. The different training layers may be provided to process STFT of the different channels before an inter-channel processing layer can process interleaved features to account for the inter-channel phase difference features, which are all part of a channel processing allowed by the feature extraction module 106 and the NN module 108.

Further, temporal processing for each channel may be performed using a temporal processing layer of the NN module 108. For example, one or more NN layers of the NN module 108 may be used with each channel or with a mixed STFT from the inter-channel processing layer to capture temporal correlations within each channel. This allows the system 100 to leverage dynamics inherent in the audio signals from the multiple microphones of the array 102. In addition, various temporal models may be used, including recurrent layers, time convolutional layers, and/or self-attention layers, along with positional encoding, as part of the layers of the NN module 108.

In at least one embodiment, cross-channel attention to process the streams associated with the channels may be performed. Further, one or more of the NN layers may use a merger of the audio signals of the audio channels into a single stream. As such, cross-channel averaging and attention can be performed using one or more layers of the NN; and such processes can apply to any number of input channels of the audio signals. For testing purposes, the merger allows part of the classification process for test audio signals received. In one example, performant and transformer-like models having the NN layers may be used for such aspects of merging of the audio signals.

A trained neural network can provide a first inferencing output that may be an embedding or feature vector. An embedding or feature vector can be used to represent information about differences related to sound sources, including differences in physical configurations of the multiple microphones of the array 102 from the training inputs that are provided pertaining to at least channel, inter-channel, spectral, and temporal information. As such, the embedding or feature vector may include a number of elements, such as 512 or 1024 elements without limitation, which allows for flexibility to generalize across different microphone arrays. The minimum number of elements may be determined using, for example, a determined formulation, and the values presented are merely examples without limitation, other than there should be a sufficient number of elements to provide reasonable accuracy. In one example, an embedding or feature vector can be a vector of significant length that can encode information about each sound source, relative to the microphone array. A NN module 108 can include at least a first NN having embedding layers that is trained to identify or discriminate locations of the different sound sources. The embedding or feature vector need not specifically encode fundamental frequency or pitch from the sound sources but may encode other aspects that include relationships between all such fundamental features.

In at least one embodiment, a task-specific model 110 can be used to perform a location-aware task using the embeddings or feature vector(s) inferred by the NN module 108. In at least one embodiment, a location-aware task can be performed using a second NN or other machine learning model that can consume the embeddings or feature vector to infer location, direction, and/or distance-related information associated with one or more of the sound sources for additional processing. The second NN or other model can be trained to infer sound associated with a location for a task to be addressed based at least in part on the embeddings or feature vector of the first NN, and for a test input provided. For example, the task and its associated location may involve suppression of sound from one of the sound sources; enhancement of sound from one of the sound sources; and/or echo cancellation with respect to the sound sources, even though the physical locations of those sources may be undeterminable. As such, the second NN is trained to provide a target that is based in part on the embeddings or feature vector of the first NN and may be unsupervised.

A further task that can be performed using such a task-specific model 110 relates to arbitration between different sound sources. For example, two microphones of two different smart speakers can receive utterances requiring a response. However, to determine which smart speaker to use to provide a response to the utterance may be a task resolved by being able to identify the source and infer proximity to one of the smart speakers, without receiving location or distance information of the source itself from the utterance. In the use of multiple smart speakers, one smart speaker may provide a response to an utterance based on physical proximity to the utterance.

In at least one embodiment, a task-specific model 110 pertaining to a second NN may be trained for proximity estimation using the embeddings or feature vector of the first NN. For example, the second NN can provide a second inference that includes information of which smart speaker is more proximate to the utterance or to provide relative distances for each smart speaker to the sound source. For example, the embeddings or feature vectors of the first NN may be used to train the second NN so that an inference on a test input involving the utterance may be associated with position information between the sound source and one smart speaker. The position information may be used in a post-processing feature of the task-specific model 110 to provide a response from a smart speaker that is closer to the sound source than one that is farther away from the sound source.

A system 100 such as that illustrated in FIG. 1 can therefore determine differences, such as levels across channels and delays, in audio signal received by multiple microphones from a sound source. As a location or physical configuration of the microphones may not be provided, a spatial representation can be determined using features of the audio signal and may be used to train a neural network to provide enhancement or filtering to one or more sounds of the audio signal. For example, even if a physical configuration of the multiple microphones, including direction or location of the multiple microphones, is unknown, an NN that is trained using different physical configurations and different sound sources can provide embeddings or feature vectors to allow estimations of the direction or location for each of the microphones. The embeddings or feature vectors are, in at least one embodiment, based in part on differences in the audio signals received through the different microphones, which is generalizable and does not rely on specific direction or location information.

Figure 2A:
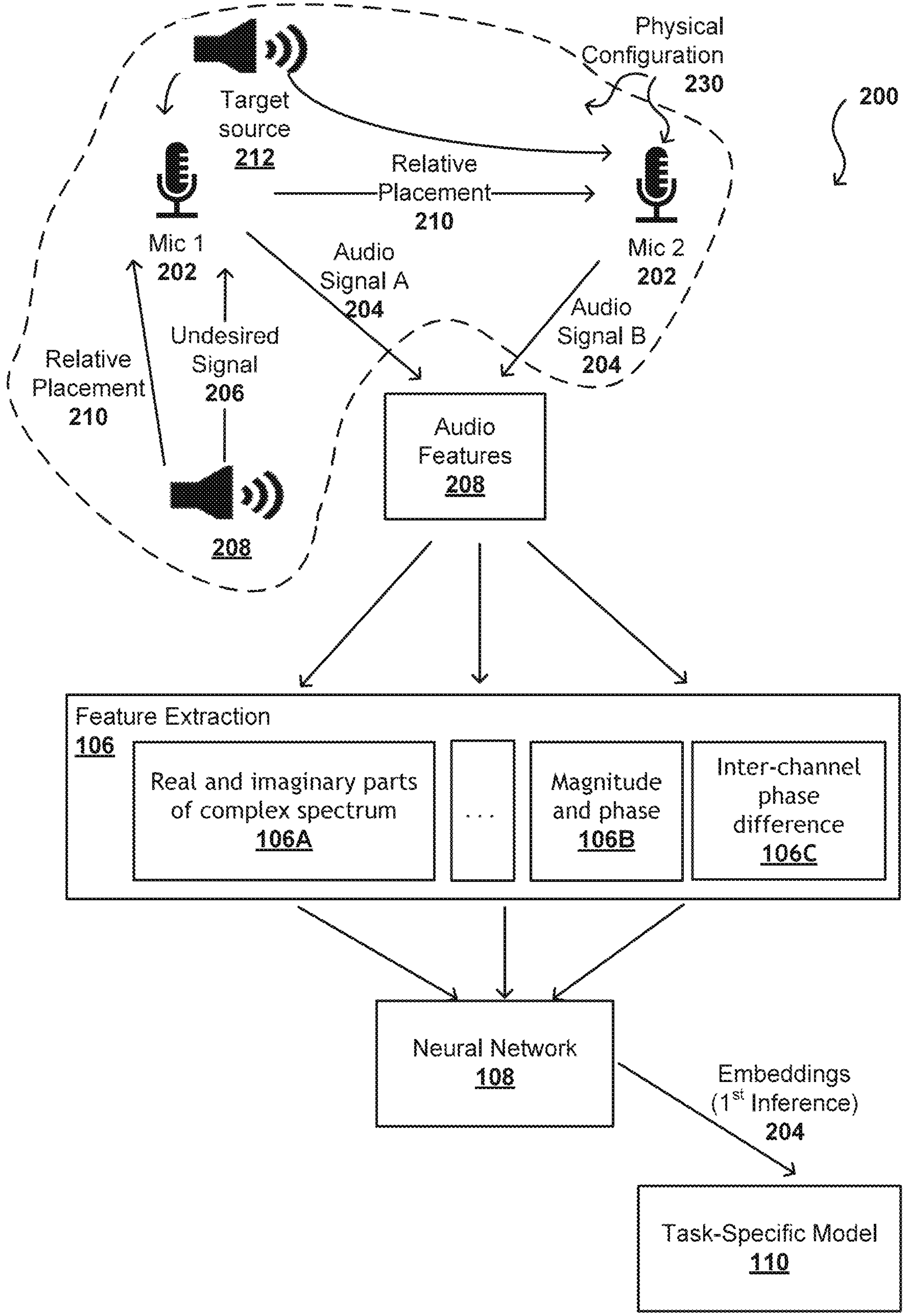
FIGS. 2A, 2B, 2C, and 2D illustrate a physical configuration of microphones and sound sources of a system for performing location-aware neural audio processing, as well as representations of audio signals captured by such microphones, according to at least one embodiment.

FIG. 2A illustrates at least a physical configuration 230, among other aspects, of different microphones and sound sources in a system 200 for performing location-aware neural audio processing, according to at least one embodiment. FIG. 2A illustrates example multiple microphones 202 in a representation of an array of microphones 202. Further, a sound source 208 that is different than one or more target sound sources 212 is within an audio capture distance of the array of microphones 202. In one example, the one or more target sound sources 212 can include a desired sound source and can provide a desired part of an audio signal received by the array of microphones 202. The array of microphones 202 picks up audio signals A and B 204 that are subject to processing for audio features 208. However, a sound source 208 that provides an undesired signal 206 may be subject to suppression, for instance, as part of the processing of the audio features 208. In at least one embodiment, the physical configuration 230 may include a configuration of different numbers of microphones 202, different relative placements 210 of the microphones, varying noise and reverberations in the microphones, among other related aspects.

The array of microphones 202 can capture audio signals A and B 204 from the environment and provide the audio signals to a data augmentation module in at least one embodiment. However, the audio signals A and B 204 may be a basis for audio features 208 to be extracted. In at least one embodiment, STFT (or other such) processes may be used to provide one or more features from the audio signals A and B 204, including real and imaginary components 106A, magnitude and phase 106B, or inter-channel phase differences 106C. In an example, the audio signals A and B 204 can be represented as a mixed signal recorded over time periods by the array of microphones 202. The audio signals A and B 204 may include a desired signal from a target source 212 (such as an utterance from a target source 212) and may include undesired signal 206 from an undesired source 208. In one example, the undesired signal 206 belongs to other sounds than a target source signal and may include environment impulse responses (such as different acoustics or audio reflections) pertaining to a function that is associated with the sound source 208 and at least one microphone 202. The audio signals A and B 204 may include a four-channel mixed signal that is aligned with time periods across the array of microphones 202.

The audio features 208 can correspond to representations following any data augmentation performed by a data augmentation module. In at least one embodiment, the audio features 208 can correspond to temporal features, spectral features, and/or inter-channel features, among other such features and generally included in the features 106A-C, that may have been extracted, as part of the audio features using the feature extraction module 106. In at least one embodiment, temporal features may be determined in a time-domain, whereas spectral features may be determined by a frequency conversion of the time domain, such as using STFT on the audio signals A and B 204.

In at least one embodiment, an NN module 108 can be trained to learn at least one type of representation of an audio signal that can map to at least one direction or location. Feature extraction can provide aspects of the audio signal, including at least real or imaginary parts of the complex spectrum 106A, magnitude and phase 106B, and inter-channel phase difference 106C, to be used in training the NN. However, an estimated reverberation ratio, along with level differences across channels may be also used in training. In one example, the reverberation ratio is a direct-to-reverberation ratio. These features may be used to build the embeddings 204 that represent spatial location information that is independent of physical knowledge from the physical configuration 230. For example, a trained NN is able to provide feature vectors or embeddings corresponding to features received in a test input that relate to specific locations, directions or positions of a source of the test input relative to at least one microphone.

Figure 2B:
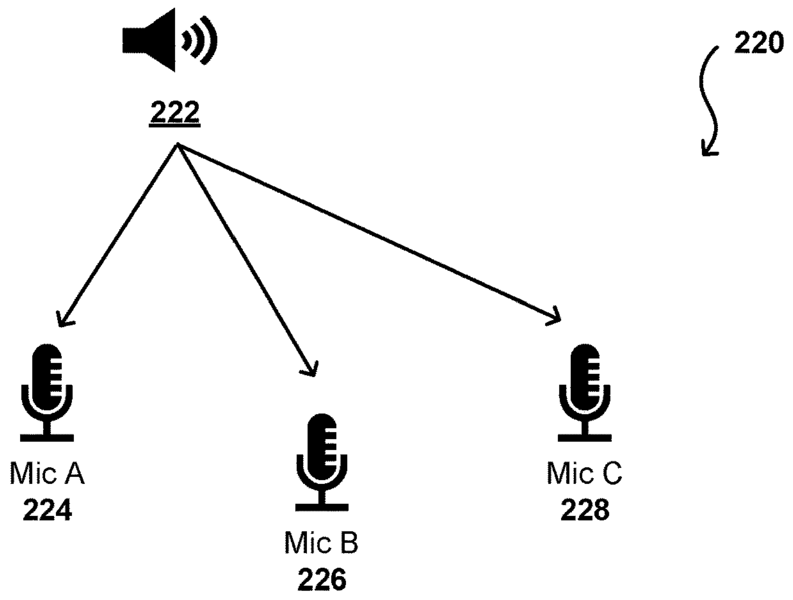
Figure 2C:
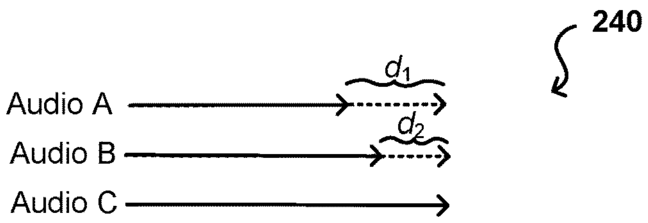
Figure 2D:
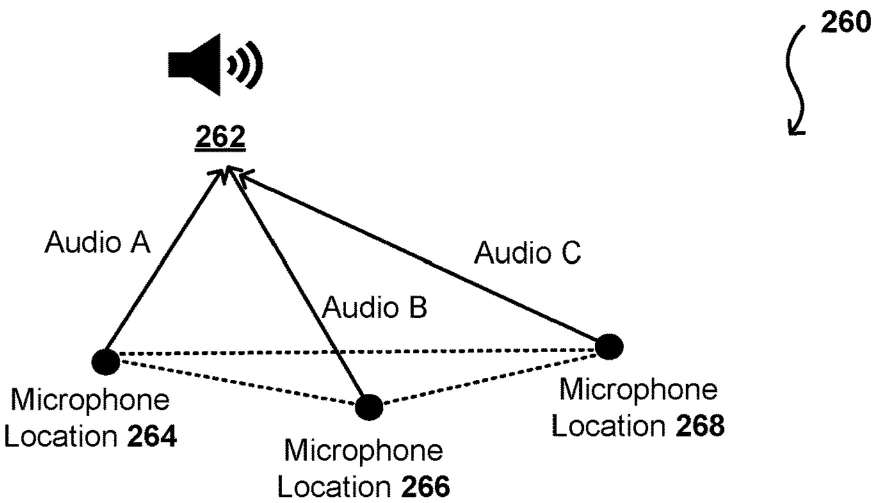

FIGS. 2B, 2C, and 2D illustrate a general example of spatial information determination that can be used in accordance with at least one embodiment. It should be understood that various approaches for determining spatial information using features extracted from audio can be used as presented herein, and that this example is presented in order to facilitate explanation of how spatial information can be determined when physical location information is not available. Various other types of features can be used as discussed herein that correspond to differences in the audio signals received to different microphones of an array, such as may be used to generate a "signature" for a given sound source with respect to the microphone array. While the differences may correspond to features such as timing of receipt or pitch, there can be various other types of features used as well, some of which may be identified by a neural network but not easily understood by a human.

In the arrangement 220 of FIG. 2B, there are three microphones 224, 226, 228 that can each capture sound from a sound source 222. One or more aspects of the captured audio will differ between the three microphones based at least on the differences in distance from the audio source. For example, the same sound will arrive at the three microphones at different times, as may correspond to the differences $d_1$ and $d_2$ in distance as illustrated in the plot 240 of FIG. 2C. All sounds from that sound source 222 at that location will arrive at those microphones 224-226 with similar delays (or other such location or distance related aspects). If the orientations 264, 266, 268 of the microphones are known, as illustrated in the arrangement 260 of FIG. 2D, then the location (or at least direction) of the sound source can be determined based on those determined differences in signals, as there will only be one location where those distance vectors can all end at the same point 262 in space when originating at those microphone locations. If the microphone array orientation is known, then this relative physical location 262 or direction can be determined based upon these differences in signal determined for the different microphones.

If the physical orientations or locations of the microphones are not known, however, then the physical location or direction also cannot be determined with any level of confidence. Considering again the distance vectors of FIG. 2C, those vectors can only be used to determine a single physical location if the start points of those vectors (or the microphone locations) are known, otherwise there may be many (or even infinitely) possible locations where those vectors could converge from unknown start points. What is known, however, is that for audio originating from that spatial location, the differences in the three distance vectors will be approximately the same, and in many instances the audio will present additional audio features that, to a trained NN, will be representative of that spatial location. Thus, even though the physical location is not provided with the audio features, one or more feature vectors, as determined by the trained NN using audio features of the sound source 222 from that location, can be identified as the vectors may include at least some of the same or similar features for other audio captured by the microphones of the array with a same or similar relative positioning or location with respect to the sound source 222. Thus, location-aware processing of audio can be performed even though the exact physical location may not be known, as features of the audio captured by a microphone array can be used to identify audio that comes from the same location. Thus, if a speaker can be determined to be in a location that has specific audio features or embeddings, then audio from that location can be enhanced for audio that exhibits similar features and audio suppressed that comes from sources at other locations or directions, and exhibit different features in the captured audio signal(s). Thus, any audio features such as those illustrated in FIG. 2C that can be determined as being consistent differences associated with different locations can be used to distinguish between audio from different locations, even though those actual physical locations may not be known.

Figure 3:
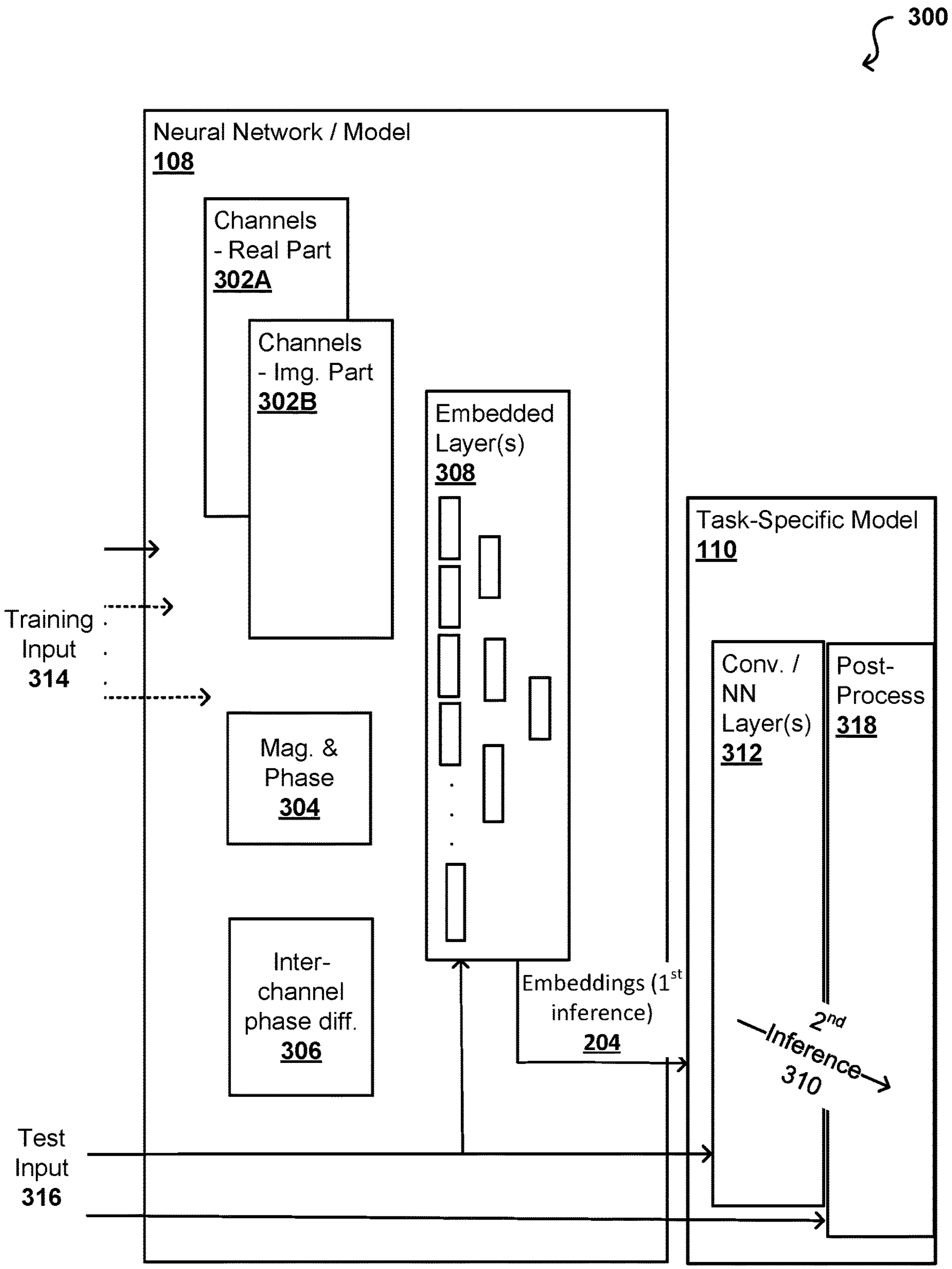
FIG. 3 illustrates details associated with processing of audio features using a neural network to generate feature vectors representing spatial locations of audio sources with respect to the microphones and audio sources, according to at least one embodiment.

FIG. 3 illustrates details 300 associated with processing of audio features using a neural network to generate feature vectors representing spatial locations of audio sources with respect to the microphones and audio sources in accordance with at least one embodiment. The audio features (e.g., 106A-C as discussed with respect to FIG. 2A) of the training input 314 may be processed (such as, in its own input vectors 302A, B, 304, 306) using embedded layers 308 of a first NN of a NN module 108. This process can generate, independent of an availability of information indicating a physical configuration 230 of an array of microphones, a feature vector or embeddings 204 representing a spatial location of an audio source with respect to the array of microphones 202. For example, once trained, the embedded layers 308 of the first NN is able to generate embeddings or feature vectors 204 that represents a first inference of locations associated with different sound sources and microphones that is estimated for a test input 316.

In at least one embodiment, the embeddings or feature vectors 204 may be used with a test input 316 to determine active periods of certain sound sources. For example, when an audio signal associated with a target sound source 212 is part of the test input 316, an inference may be made using the embeddings or feature vectors 204 to determine that the target sound source 212 is active over a given period. Further, the embeddings or feature vectors 204 may be associated with the second inference 310 of a second NN layer(s) 312 that may be generated and used with specialized applications, including for audio signal enhancement. As such, additional classifications or inferences may be provided using different embeddings or feature vectors 204, where each embedding or feature vector is to a different spatial aspect, including to a location, a direction, a relative positioning, etc., of a target sound source providing the test input 316 and at least one microphone in the array of microphones.

In one example, location-aware neural audio processing is not constrained to a particular geometry and does not need to map to a particular physical location—such as direction and distance—for the test input 316. Instead, the embeddings or feature vectors 204 represent an encoding of a particular location in space. For a particular microphone geometry, it is possible, using the features described herein and the embedded layers 308, to encode a particular location in space so that a determination can be approximated by the inference of a coordinate axis, of a relative axial orientation (including in x, y, and z axis) or an inference in the Euclidean system with two angles and a distance, based on a test input 316. This approach can be generalized to different microphone geometries provided that the embeddings or feature vectors are sized to include sufficient information to allow discrimination for different microphone arrays at different sources.

In at least one embodiment, an environment such as that illustrated in FIG. 2A, having the physical configuration 230, can be a car or can pertain to a computer or an Internet of Things (IoT) device. To extract speech that corresponds to an occupant, such as a driver, in the car, or to a user of the computer or IoT device (e.g., a digital kiosk that may display a digital avatar or other digital assistant), from others in the environment, approaches herein allow for the use of a trained first neural network to provide embeddings or feature vectors 204 for different locations, directions, or relative positionings for at least one occupant with respect to the other occupants. For example, the first NN can be trained to provide a location-aware embedding or feature vector 204 that encodes information about the location, direction, or relative positioning of the target sound source relative to the microphone array 202, which may include a relative spatial position of other occupants or which may include other sound sources.

In one example, an audio signal for a target sound source 212 may be extracted by generating an embedding or feature vector 204 that corresponds to audio patterns of the target sound source 212. In a smart speaker environment, a smart speaker can be configured to recognize only a target sound source 212 using multiple recordings of sentences, for instance. However, in addition to recognizing the target sound source 212, the embedding or feature vector 204 is also trained to learn a profile that corresponds to a particular location of the target sound source 212 relative to the location of an array of microphones 202. Further, there may be embeddings or feature vectors 204 to allow generalizations across different geometries of the array of microphones where each embedding or feature vector corresponds to one microphone of the array; then, a test input may be used with each embedding or feature vector to infer if a location or other spatial feature can be provided for the test input.

Location-aware neural audio processing has an advantage over estimating direction alone because if the first neural network is trained in a way that it is able to generalize the information it has, then it is not necessary to track any particular microphone configuration. This approach can be used with a calibration or test phase and can be used to extract audio signals from a particular location to generate embeddings or feature vectors of that location with respect to the array of microphones. Subsequently, a second inference of a task-specific model that may have a convolution NN (CNN) or other types of NN that may be directed to performing speech extraction, as well as for audio interference, suppression, enhancement, and/or echo cancellation, of one or more audio signals that are part of a test input 316 and that uses the embeddings or feature vectors of the embedded layers 308. The task-specific model 110 is able to provide post-processing 318 based in part on one audio signal determined to be from a certain position or general location.

The location-aware neural audio processing, during training, does not require specific knowledge about the location of the array of microphones 202 that corresponds to the occupant or person of interest. For example, simulated or recorded sounds may be used, during training for the first NN as part of the training input 314, from multiple positions in an environment to create robust embeddings or feature vectors to be used with the test input 316 in a live environment to estimate location of a sound source in the test input. Further, as there is no need for geometry requirements to be provided as to the locations of the array of microphones 202, with respect to the test input 316, and as to relative spacings or placements 210 and other spatial information is encoded in the embeddings 204, the location-aware neural audio processing herein is scalable.

In at least one embodiment, as real or simulated audio data may be used to generate audio signals received by an array of microphones 202 the inferred embeddings or feature vectors 204 are robust and are generalizable to cover as many different configurations as possible. The training input (such as in training input 314 in FIG. 3) can include different arrays of microphones in different configurations, including in different rotations, placements, and positioning, for instance. There may be no constraints on environments associated with the array of microphones for training.

In one example, an environment may include rooms, open or closed areas, and other real estate or layout configurations. Further, barriers and physical installations may be also accounted for in the location-aware neural audio processing herein. For example, baffles and other mountings of one or more arrays of microphones would not interfere with the inferences pertaining to spatial information in the embeddings or feature vectors. Some microphones that provide training input may be mounted on various devices, such as on computers. However, it is possible to simulate sound sources around these microphone configurations to cause environmental effects such as the barriers, which can then have no effect on the inferred embeddings or feature vectors for a test input. In at least one embodiment, a benefit of such training input allows the embeddings 204 to be used to detect presence of a person or other barrier in front of a sound source, during testing, and allows for reactionary measures. A reactionary measure can be to turn a screen of a kiosk automatically on determination of someone being near or in front of the device or to provide better reception to audio signals around the barrier.

Further, with a trained first NN having the embedded layers 308, it is possible to use the embeddings 204 to adjust aspects of the test input having audio signals from an environment. For example, for a test input 316, any source of audio signal that is around one or more of the microphones 202 may be provided along with the embeddings or feature vector 204 to allow determination of an estimated direction or other estimated spatial information. Further post-processing 318 in the task-specific model 110 allow for pass-through, suppression, and/or enhancing of an audio signal of the estimated direction. Alternatively, suppression may be applied to audio coming from other directions in the test input but pass-through or enhancement may be performed for the audio signal of the estimated direction.

In at least one embodiment, such an approach can eliminate the need to know the microphone geometry of the system that is part of the physical configuration of the microphones of the system. Further, to allow scalability to random devices with random physical configurations in the system for location-aware neural audio processing, a service can be provided to extract a voice of a user, such as a driver of a vehicle, from different locations in the vehicle. As different car manufacturers may provide a different microphone configuration, such as a different number of microphones and a different location, the approaches herein remove a need to know the location of the microphones in advance for the test input and remove a need to know or to estimate the placement of the microphones for the test input.

In at least one embodiment, dynamic updating is possible for the embedded layers 308 over time, such as to track where a user moves, relative to the array of microphones. For example, a target sound signal (of a target source 212) may be tracked to provide dynamic training input 314 and to perform dynamic training of the first NN of the NN module 108. As a result, the embeddings 204 may be updated to reflect changes in position. In at least one embodiment, the embeddings 204, the second inference 310, or the post-processing 318 of the task-specific model 110 allow configuring of a directional or other related aspects associated with a second inference 310 to be made.

The directional or other related aspects include a closeness or a location range in an environment relative to a target source signal that is a focus of the post-processing 318. Therefore, for certain embeddings or feature vectors 204, an estimated direction may be inferred using the embeddings or feature vectors 204 that include an adjustment of +/−15 degrees, for instance, in a direction associated with a target source signal. For example, there may be a distribution in multiple axis around an estimated location or direction. To allow extraction of information from around a location or direction associated with a target sound signal, a space can be defined with respect to at least the embedded layers 308 to allow the embeddings or feature vectors 204 to use such information.

Therefore, instead of training the embedded layers 308 for a particular direction, the embedded layers 308 may be trained to generate embeddings 204 for a closeness to a particular location or direction. Alternatively, the trained embedded layers 308 may be used with a test input and with additional input requiring a more generic inference to provide a closeness to a particular location or direction without changes to the trained embedded layers 308. Therefore, it is possible to determine whether to extract information associated with the closeness to the embeddings. In at least one embodiment, an embedding 204 from the embedded layers 308 can be used to represent spectral information corresponding to a target source signal. The embedding may be used to determine speaker extraction and other actions for the task-specific model 110. The embeddings 204 can also be used to represent spatial information of a particular sound source 208, independent of the speaker or the sound. This spatial information can be generalized to different microphone geometries by the embeddings or feature vectors 204 that incorporate learning from the features extracted and processed through the embedded layers 308.

In at least one embodiment, the embedded layers 308 represent an NN that is trained across multiple geometries and using different features of the audio signals associated with the array of microphones. Further, the use of data augmentation, to provide speech enhancement, for instance, ensures that the NN is robust and generalizable to both speech and non-speech audio. As a result, the NN can be trained with speech, noise, music, or various other types of sounds from various other sound sources. The embedded layers 308 represent an NN that is trained on location estimation or equivalence and that is trained on a large training corpus that has different microphone arrays and physical configurations, as well as different places of audio sources with respect to those configurations. The embeddings and feature vectors allow discrimination across different locations and physical configurations and can help teach a further NN of a task-specific model to encode location information from the microphone signals.

The location-aware neural audio processing herein can account for barriers that may be present between a sound source and a microphone. Therefore, instead of determining a steering vector or relative transfer function, which may be an analytical model for signal propagation, training the NN for embeddings or feature vectors using the large training corpus overcomes the exceptions or assumptions associated with such barriers. While a steering vector informs about a sound source at a given direction, audio signals received at a microphone may have differences and relative delays unrelated to the direction itself because of the barriers. The location-aware neural audio processing removes a need to introduce assumptions about certain properties of an array of microphones pertaining to the barriers. For example, baffle effects may be avoided where baffles may be associated with one or more of the microphones. There is no requirement to assume free field propagation or other practical or theoretical assumptions using location-aware neural audio processing.

In at least one embodiment, a neural network can be trained to discriminate different locations based at least on the audio signals from a target sound source (as part of a test input) using features extracted from the audio signals. A test input 316 can represent features extracted from an example target sound signal. Multiple instances of a NN can be trained to classify whether sounds within an audio signal are coming from a same location, or from different locations or directions in space. In at least one embodiment, at least two sound sources may be provided in training for purposes of improving robustness and generalizations for the system herein. It may be beneficial to use multiple sound sources, as three or more sound sources may be use beneficially to ensure certainty of spatial position. Further, use cases may also benefit from at least two or three or more microphones capturing audio signals to be used with a trained NN of the system herein. If only two microphones are used to localize a source then front-back confusion may occur as the same differences may be determined for two different locations in front of, and behind, the pair of microphones (or in different directions relative to a line between the two microphones).

In at least one embodiment, a single physical microphone may include multiple sensors or portions for which differences in signals can be detected. In this manner, inferences with two microphones may be used in a limited manner, including for suppressing noise outside spatial regions associated with at least two sound sources or microphone. As such, an NN of the NN module 108 that is trained to provide embeddings or feature vectors can be used to discriminate different locations associated with audio signals received and processed by the NN module 108. Further, to localize an audio source, it is possible to train the NN of the NN module 108 to always estimate direction and distance to the microphones of the array 102.

Figure 4:
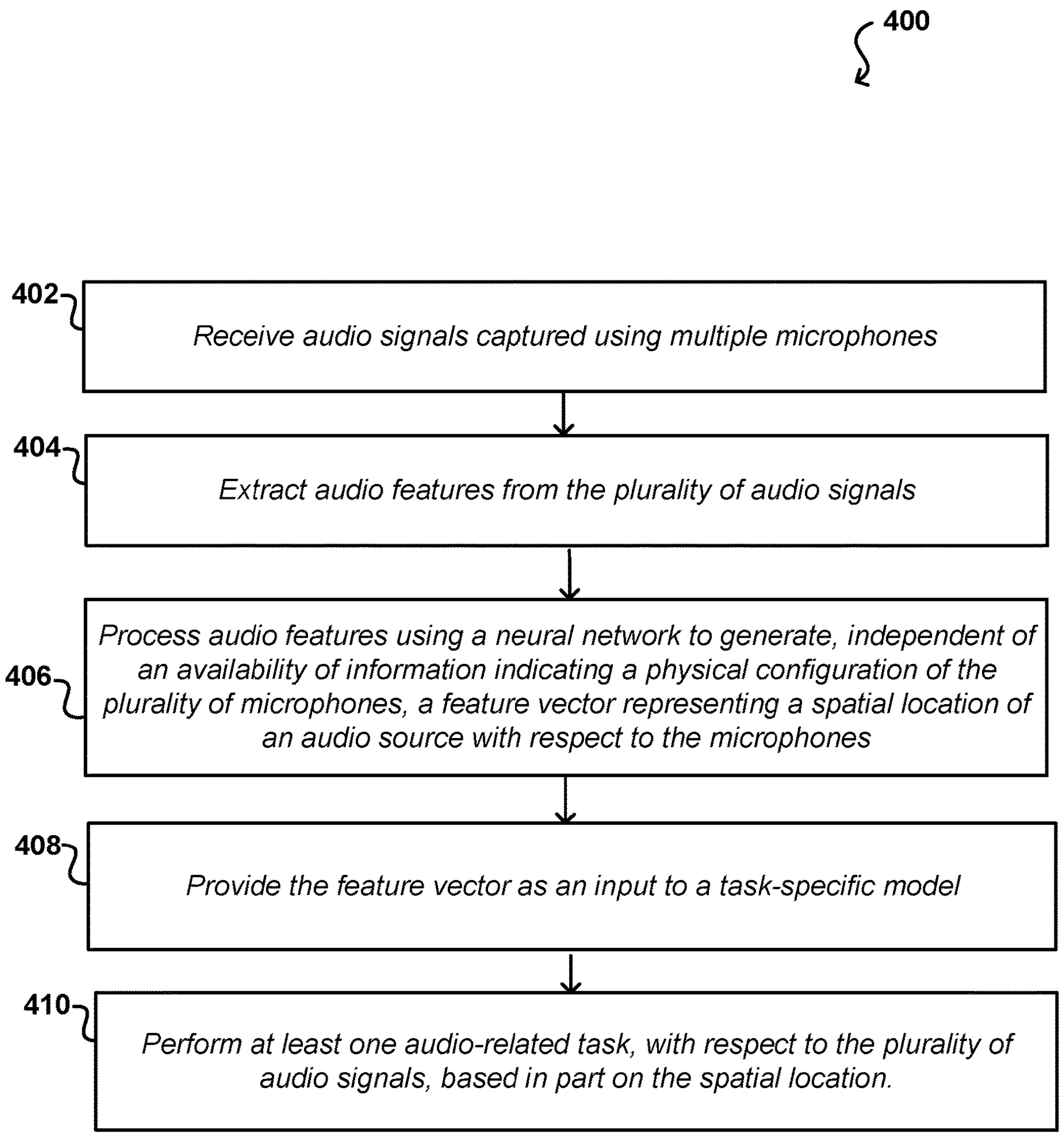
FIGS. 4-5 illustrate example processes to be used with a system to perform location-aware neural audio processing, according to at least one embodiment.

FIG. 4 illustrates an example process 400 to be used with a system to perform location-aware neural audio processing, according to at least one embodiment. It should be understood that for this and other processes discussed herein that there may be additional, fewer, or alternative steps performed in similar or alternative orders, or at least partially in parallel, within the scope of the various embodiments unless otherwise specifically stated. In this example, audio signals are received 402 that were captured using multiple microphones, where the positions or directions of one or more of those microphones may not be known to the system or available to the process. A set of audio features can be extracted 404 from the received audio signals, and those extracted audio features may be used to generate a set of embeddings or latent features, among other such options. The method audio features can be processed 406 using a trained neural network to generate, independent of availability of information indicating a physical configuration of the plurality of microphones, at least one feature vector (or other set of embeddings or representation) representing a spatial location of an audio source with respect to the microphones. The feature vector (or other representation) can be provided 408 as an input to a task-specific model (or module), along with other input such as the captured audio data or signals. The task-specific model (or module) can perform 410 at least one audio-related task, with respect to the audio data or signals, based in part on the spatial location information inferred by the neural network.

Such a process 400 can be supported by including, in the audio-related task performed, an extraction of speech corresponding to the spatial location, echo cancellation, enhancement of audio received from the spatial location associated with the audio source, or suppression of audio received from locations other than the spatial location associated with the audio source. Further, the audio features of step 404 include differences in the audio signals corresponding to at least one of real or imaginary parts of a complex audio spectrum, signal magnitude, signal phase, or direct-to-reverberation ratio.

In at least one embodiment, such a process 400 is supported by inclusion, in the feature vector, of a minimum number of elements, such as at least 512 or 1,024 elements, where none of the elements are (or may be) required to relate to a physical direction or physical location with respect to one or more of the plurality of microphones. Further, such a process can include a further step or a sub-step to merge the audio signals into a single audio signal before the performing step 410 for the at least one audio-related task. A further step or sub-step in the process can 400 include analyzing audio indicated to have been generated by the sound source in order to identify audio from the sound source represented in the plurality of audio signals. In at least one embodiment, such a process 400 can be supported by one or more of the feature vector representing a location-aware embedding of the audio source in a latent space; the audio features including cross-channel features, temporal features, and spectral features; or the microphones being allowed to include different types of audio capture devices.

Figure 5:
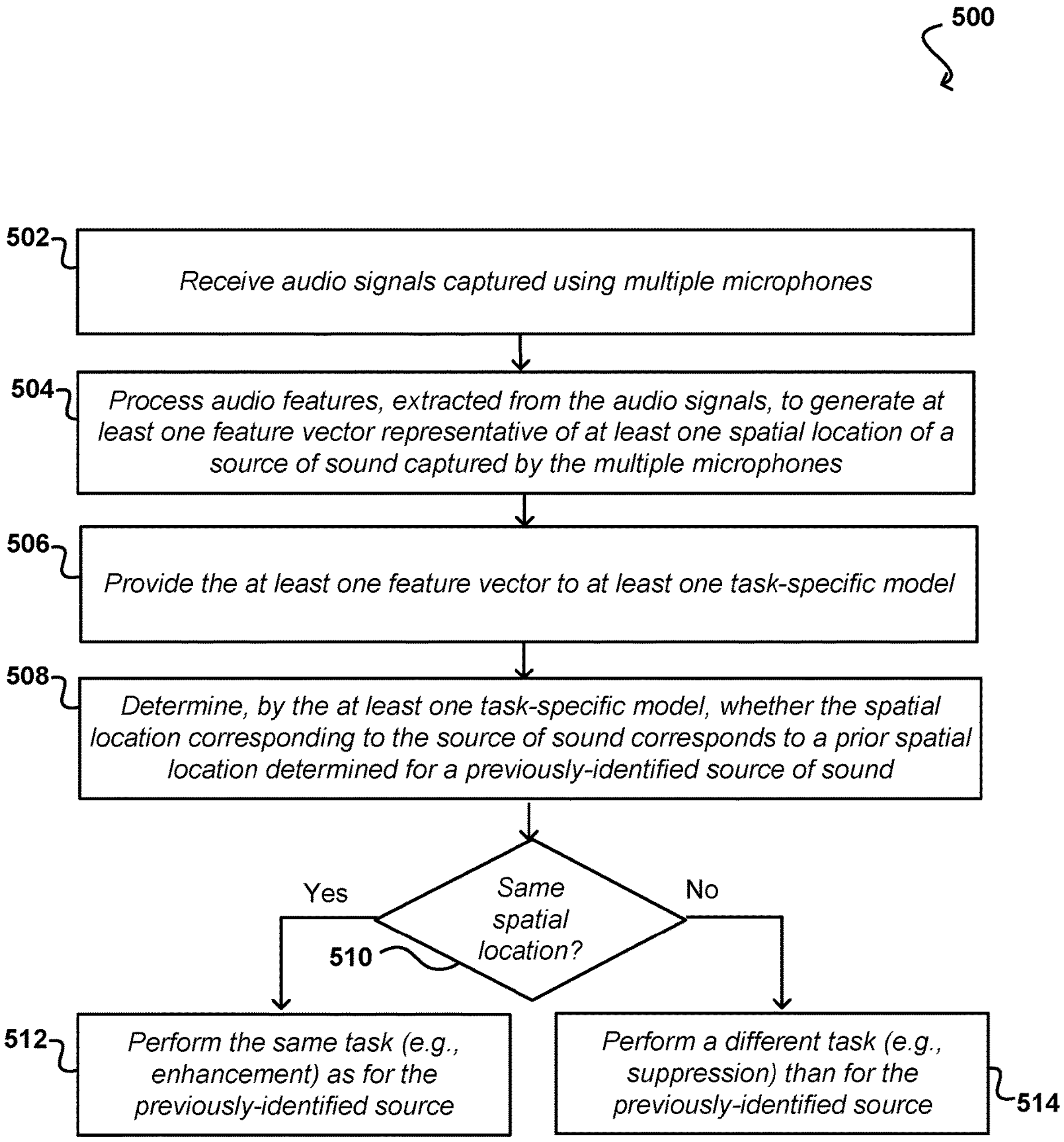

FIG. 5 illustrates another example process 500 that can be used with a system to perform location-aware neural audio processing, according to at least one embodiment. In this example process 500, audio signals are received 502 that were captured using multiple microphones, where those audio signals may include audio generated from one or more audio sources within an audio capture range of at least one of the microphones. Audio features, extracted from the audio signals, can be processed 504 to generate at least one feature vector representative of at least one spatial location of a source of sound captured by the multiple microphones. The locations or orientations of any, or all, of the microphones may not be known, such that the spatial location itself may not have a known correlation to a physical location. The at least one feature vector can be provided 506 as input to at least one task-specific model. The at least one task-specific model can determine 508 whether a spatial location corresponding to the source of sound corresponds to a prior spatial location determined for a previously-identified source of sound, such as where the spatial locations are inferred to correspond to the same spatial location within an allowable tolerance or location determination threshold. If it is determined 510 that the spatial locations are the same, and the sounds then likely correspond to the same source of sound or a new source of sound at the same location, then the same task can be performed 512 as for the previously-identified source, such as to enhance audio received from a person speaking from a certain location, region, or direction. If it is determined that the spatial locations are not the same, such as where the spatial locations are inferred to correspond to different spatial locations outside an allowable tolerance or location determination threshold from each other, then a different task 514 can be performed (using the same task-specific model or a different task-specific model) than was performed for the previously-identified source, such as to suppress audio received from a different person speaking from a different location, as may relate to background noise or undesired speech.

In at least one embodiment, a spatial location of a source of sound may be monitored and updated over time, in order to track where a user or audio source moves, relative to the array of microphones, reflecting a change in position of target audio signal. In one example, a target audio signal (of a target source) may be tracked to provide dynamic training input and to perform dynamic training of the first NN of an NN module. As a result, the embeddings or feature vectors may be updated to reflect changes in position. In at least one embodiment, the updates to the embeddings or feature vectors allow for updates to the following inferences and post-processing aspects of a task-specific model allow configuring of a directional or other related aspects associated with changes to the inferences previously made.

Figure 6:
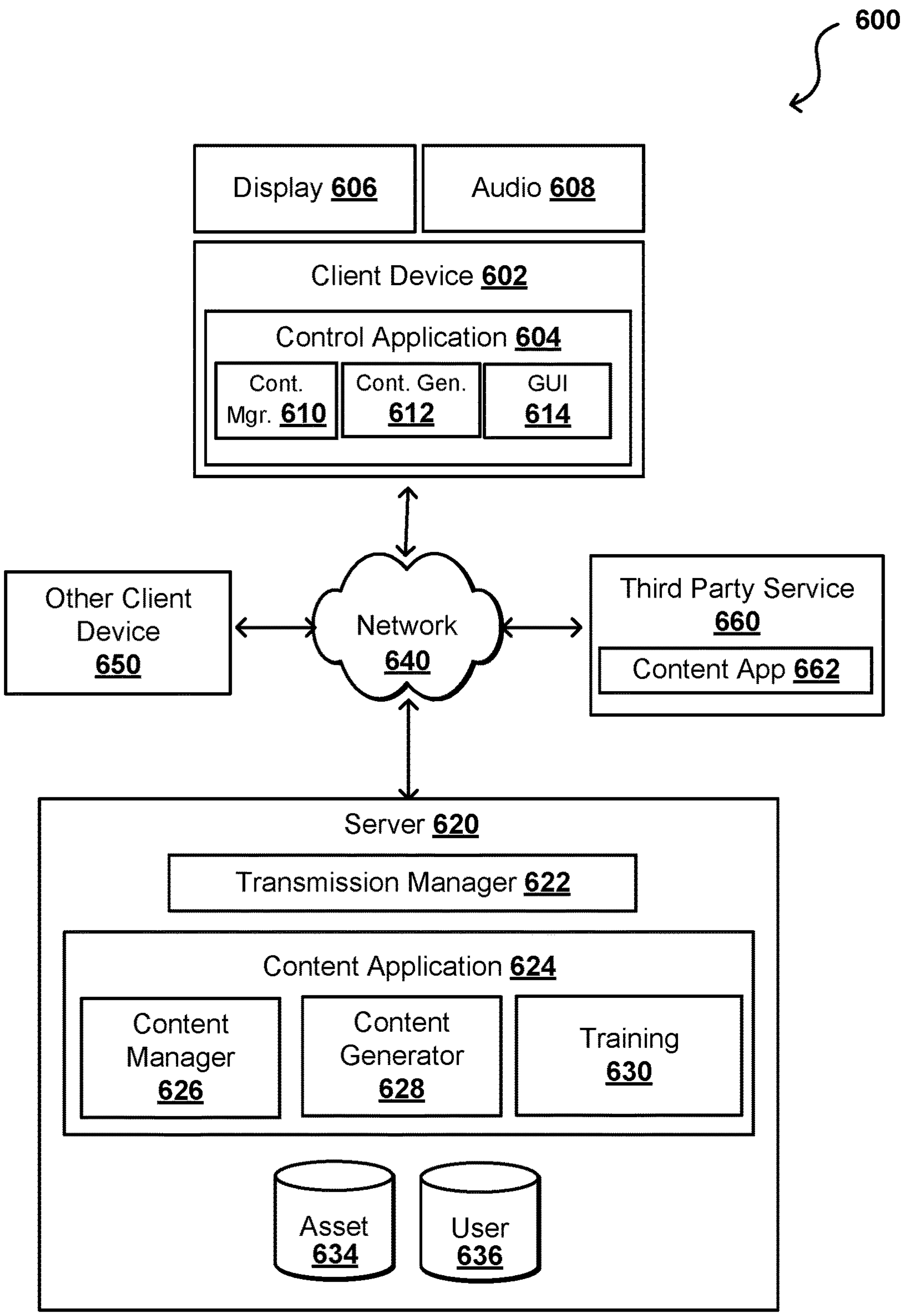
FIG. 6 illustrates components of a distributed system that can be used to perform location-aware neural audio processing, according to at least one embodiment.

FIG. 6 illustrates an example networked system configuration 600 that can be used to provide, generate, modify, encode, process, and/or transmit audio data or other such content. In at least one embodiment, a client device 602 can generate or receive data for a session using components of a control application 604 on a client device 602 and data stored locally on that client device. In at least one embodiment, a content application 624 executing on a server 620—such as a cloud server or edge server—may initiate a session associated with at least that client device 602, as may use a session manager and user data stored in a user database 636, and can cause content such as one or more audio representations—such as embeddings or feature vectors—from an object repository 634 to be selected by a content manager 626 for processing.

A content manager 626 may additionally, or alternatively, work with a content generator 628 to generate novel content, such as updates to embeddings or feature vector. The embeddings or feature vector can be generated for audio signals of one or more object classes for which one or more models or networks were trained, using a training module 630. In at least one embodiment, this content generator 628 can receive audio input and perform aspects of the location-aware neural audio processing. At least a portion of the generated embeddings or feature vector—which may correspond to a synthesized data (e.g., simulated audio) useful in generating such an embeddings or feature vector—may be transmitted to the client device 602 using an appropriate transmission manager 622 to send by download, streaming, or another such transmission channel.

An encoder may be used to encode and/or compress at least some of this data before transmitting to the client device 602. In at least one embodiment, the client device 602 receiving such content can provide this content to a corresponding control application 604, which may also or alternatively include a graphical user interface ("GUI") 614, content manager 610, and content generator 612 for use in selecting, providing, synthesizing, rendering, modifying, or using content for presentation (or other purposes) on or by the client device 602. A decoder may also be used to decode data received over the network 640 for presentation via client device 602, such as audio or video content through a display 606 and audio, such as sounds and music, through at least one audio playback device 608, such as speakers or headphones.

In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network ("LAN"), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by allowing the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more VMs. In at least one embodiment, such a system can be implemented at least partially in a data center or at least partially using cloud computing resources.

Inference and Training Logic

Figure 7A:
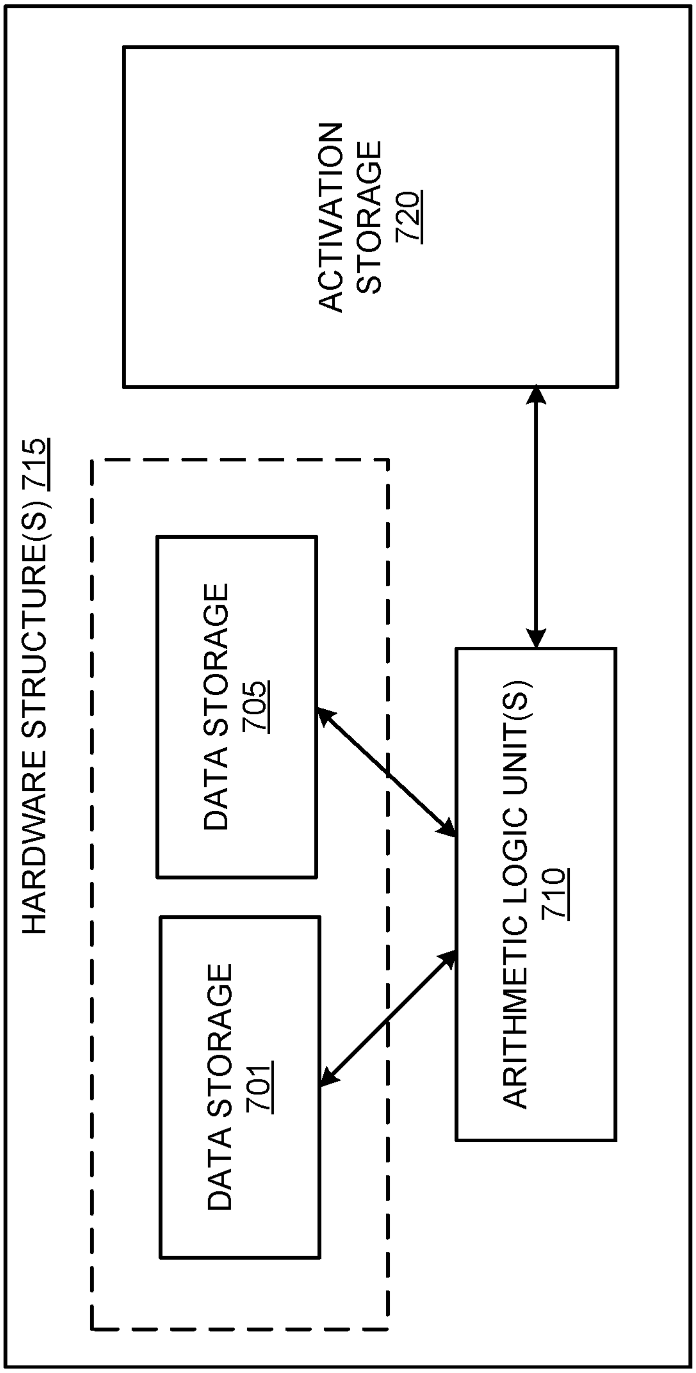
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic unit(s) ("ALU(s)"). In at least one embodiment, code, such as graph code, loads weight or other parameter information into processor ALU(s) based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (for example, Flash memory), or other storage. In at least one embodiment, choice of whether code and/or data storage 701 is internal or external to a processor, for example, or comprised of DRAM, SRAM, Flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, ALU(s). In at least one embodiment, code, such as graph code, loads weight or other parameter information into processor ALU(s) based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (for example, Flash memory), or other storage. In at least one embodiment, choice of whether code and/or data storage 705 is internal or external to a processor, for example, or comprised of DRAM, SRAM, Flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (for example, graph code), a result of which may produce activations (for example, output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 701 and/or code and/or data storage 705 are used as operands along with other values, such as bias values, gradient information, momentum values, or other parameters or hyperparameters, any or all of which may be stored in code and/or data storage 701 or code and/or data storage 705 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (for example, a co-processor). In at least one embodiment, ALU(s) 710 may be included within a processor's execution units or otherwise within a bank of ALU(s) accessible by a processor's execution units either within same processor or distributed between different processors of different types (for example, CPUs, GPUs, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (for example, Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash memory or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit ("IPU") from Graphcore™, or a Nervana® (for example, "Lake Crest") processor from Intel Corp. In at least one embodiment, inference and/or training logic 715 illustrated in FIG. 7A may be used in conjunction with CPU hardware, GPU hardware or other hardware, such as field programmable gate arrays ("FPGAs").

Figure 7B:
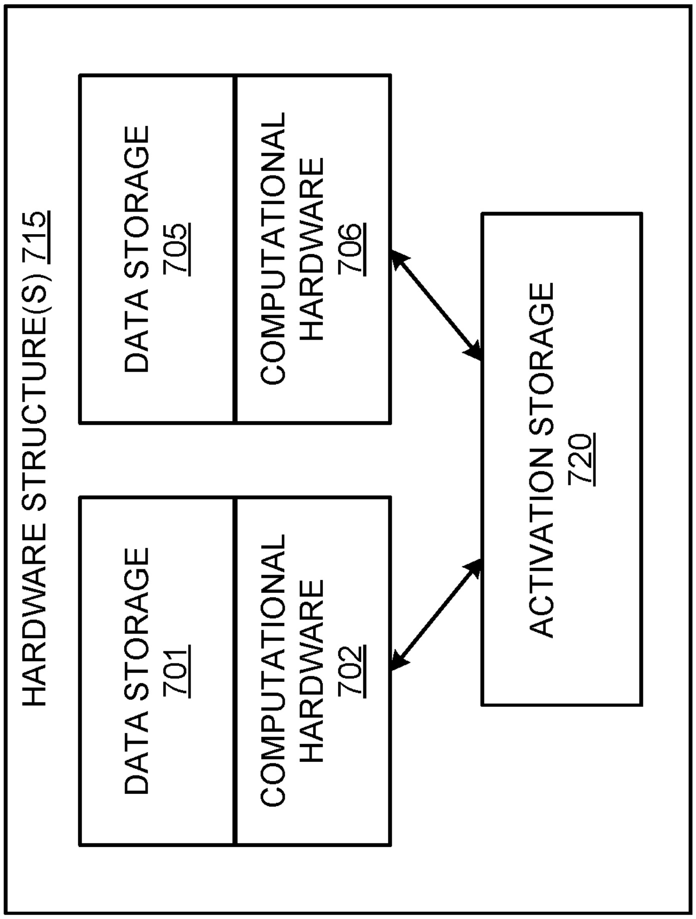
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an ASIC, such as Tensorflow® Processing Unit from Google, an IPU from Graphcore™, or a Nervana® (for example, "Lake Crest") processor from Intel Corp. In at least one embodiment, inference and/or training logic 715 illustrated in FIG. 7B may be used in conjunction with CPU hardware, GPU hardware or other hardware, such as FPGAs. In at least one embodiment, inference and/or training logic 715 includes, without limitation, code and/or data storage 701 and code and/or data storage 705, which may be used to store code (for example, graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALU(s) that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
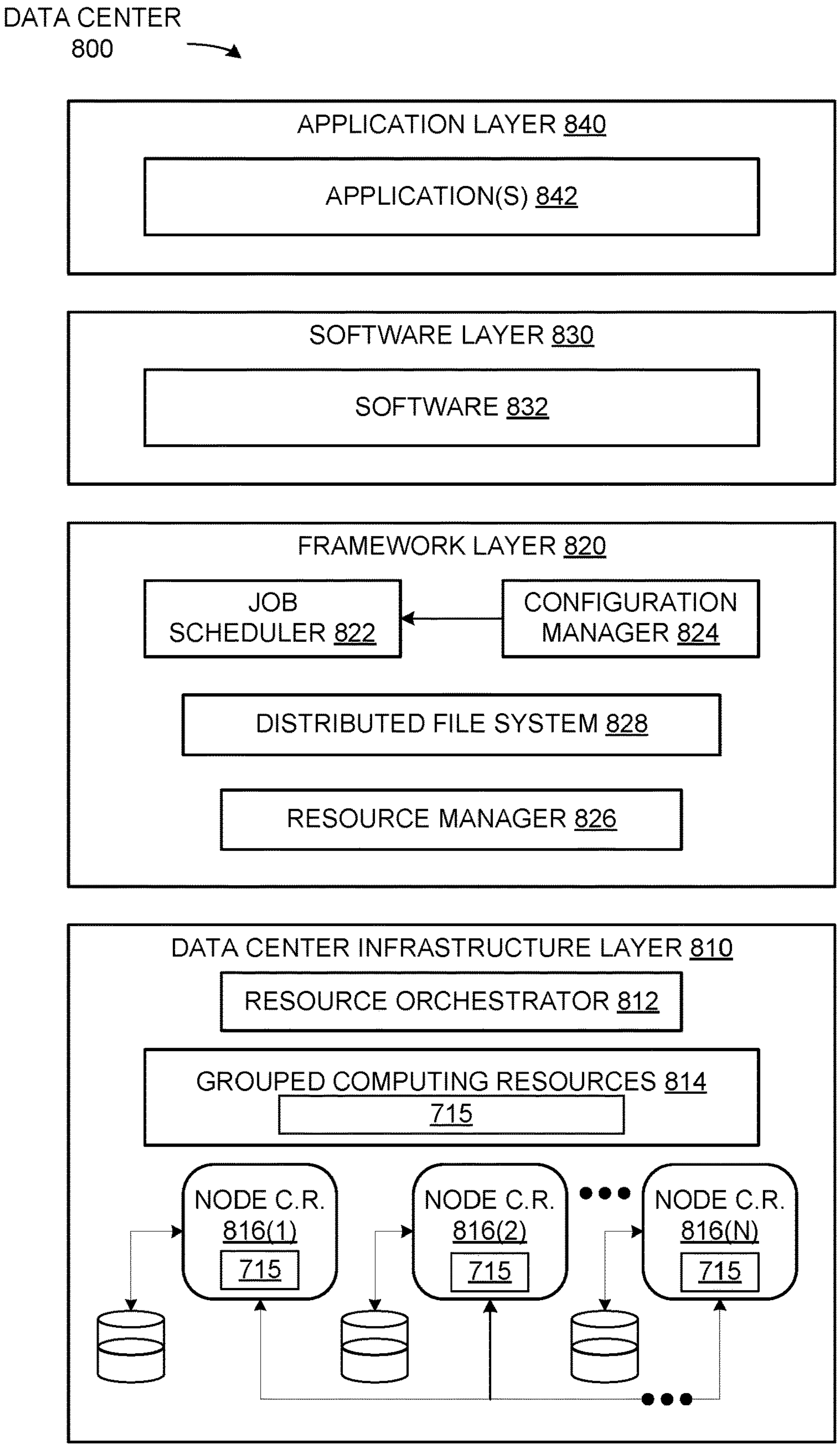
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of CPUs or other processors (including accelerators, FPGAs, graphics processors, etc.), memory devices (for example, dynamic read-only memory, storage devices (for example, solid state or disk drives), network input/output ("NW I/O") devices, network switches, VMs, power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826, and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud, and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (for example, "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (for example, PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, ASICs, GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence ("AI") services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to perform location-aware tasks for captured content when physical location information for one or more capture devices is unavailable.

Computer Systems

Figure 9:
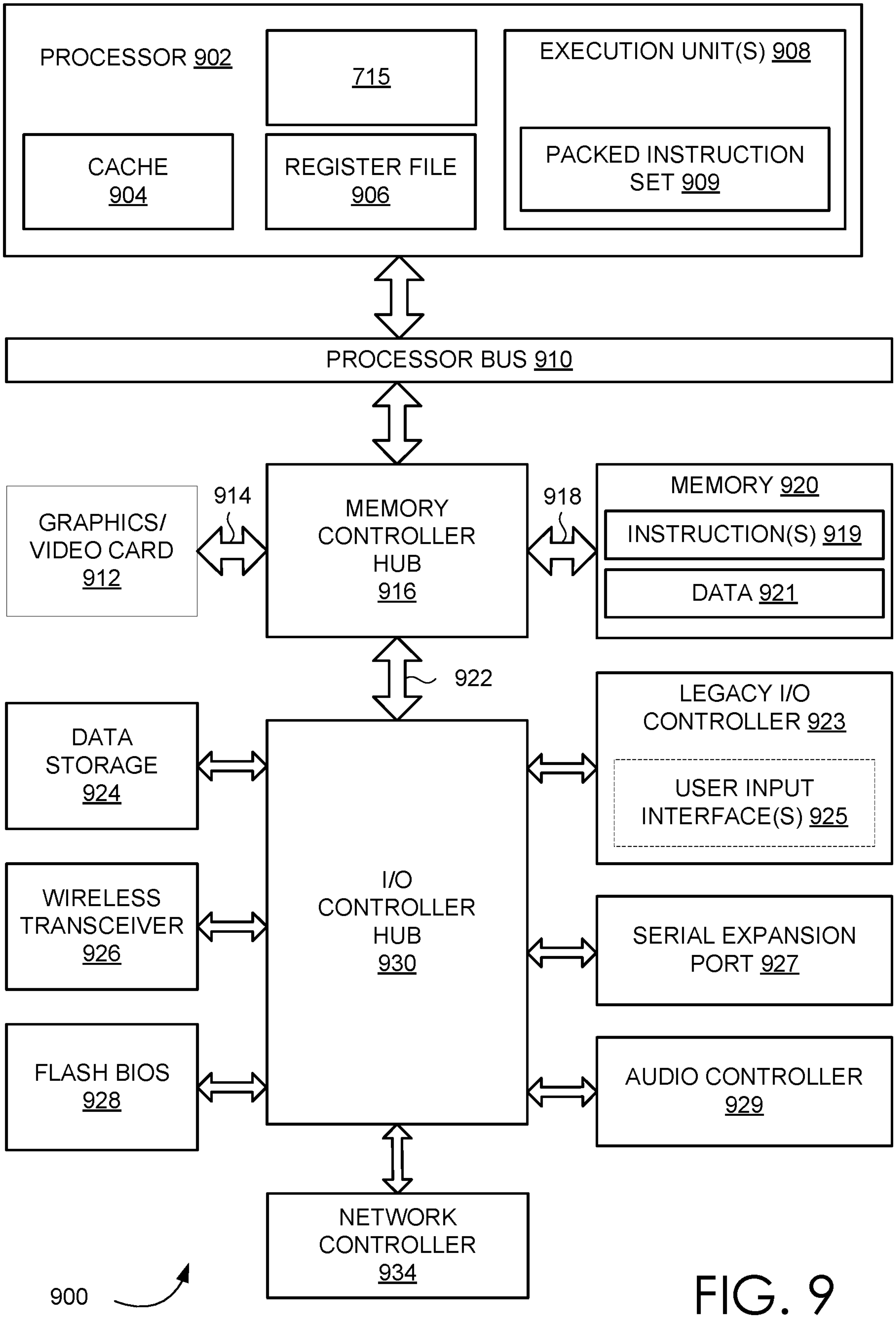
FIG. 9 illustrates a computer system, according to at least one embodiment.

FIG. 9 is a block diagram illustrating an exemplary computer system, which may be a system with interconnected devices and components, a system-on-a-chip ("SOC") or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), SOC, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution unit(s) 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word computing ("VLIW") microprocessor, a processor implementing a combination of instruction sets, or any other processor device, such as a DSP, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache 904 may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit(s) 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit(s) 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor data bus 910 for performing operations on packed data, which may eliminate need to transfer smaller units of data across processor data bus 910 to perform one or more operations one data element at a time.

In at least one embodiment, execution unit(s) 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a DRAM device, a SRAM device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and user input interface(s) 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary SOC. In at least one embodiment, devices may be interconnected with proprietary interconnects, standardized interconnects (for example, PCIe) or some combination thereof. In at least one embodiment, one or more components of computer system 900 are interconnected using compute express link ("CXL") interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to perform location-aware tasks for captured content when physical location information for one or more capture devices is unavailable.

Figure 10:
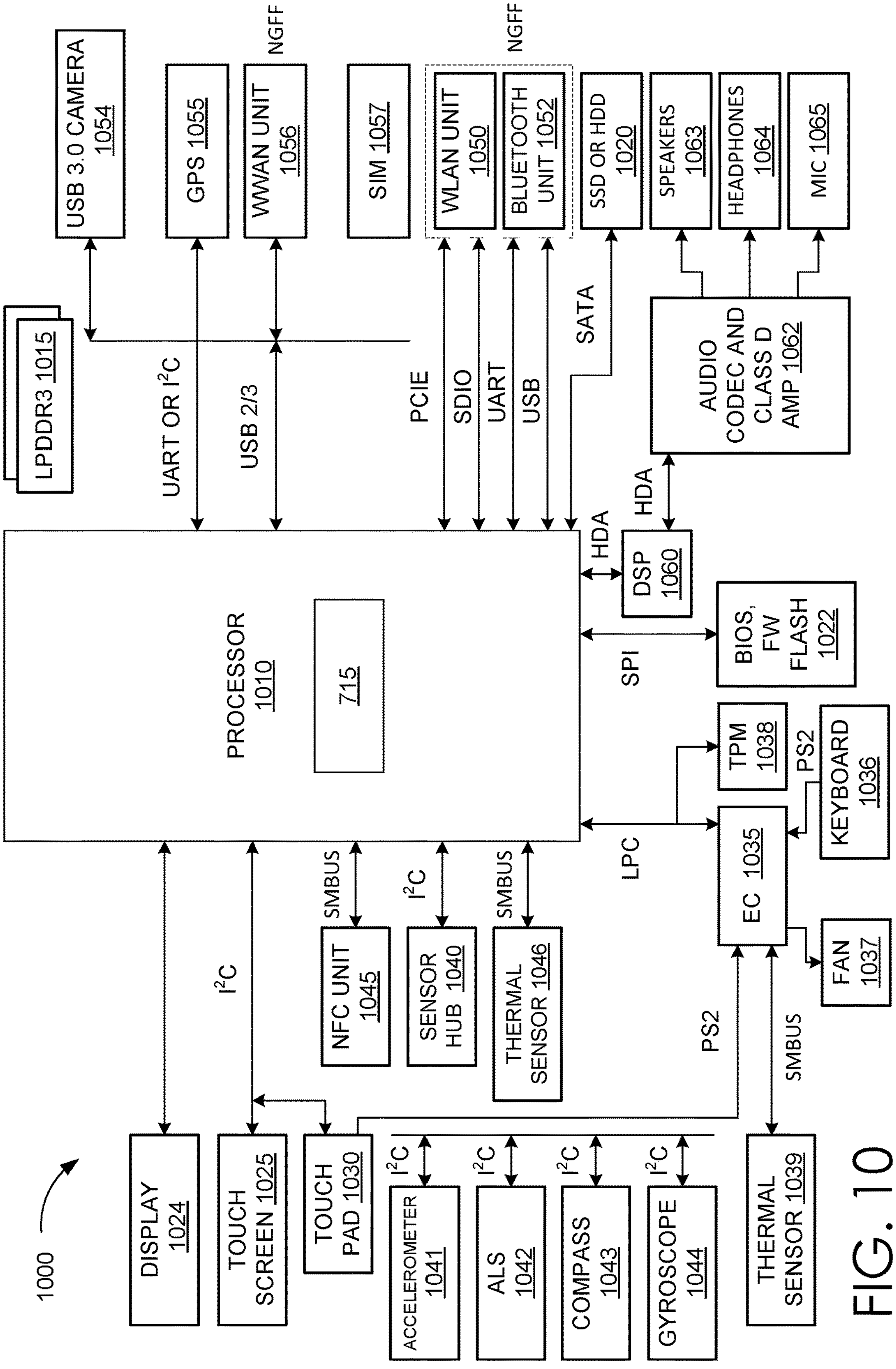
FIG. 10 illustrates a computer system, according to at least one embodiment.

FIG. 10 is a block diagram illustrating an electronic device 1000 for using a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, an USB (versions 1, 2, 3), or an Universal Asynchronous Receiver/Transmitter ("UART") bus. In at least one embodiment, FIG. 10 illustrates an electronic device 1000, which includes interconnected hardware devices or "chips", whereas in other embodiments, FIG. 10 may illustrate an exemplary SOC. In at least one embodiment, devices illustrated in FIG. 10 may be interconnected with proprietary interconnects, standardized interconnects (for example, PCIe) or some combination thereof. In at least one embodiment, one or more components of FIG. 10 are interconnected using CXL interconnects.

In at least one embodiment, FIG. 10 may include a display 1024, a touch screen 1025, a touch pad 1030, a Near Field Communications ("NFC") unit 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network ("WLAN") unit 1050, a Bluetooth unit 1052, a Wireless Wide Area Network ("WWAN") unit 1056, a Global Positioning System ("GPS") 1055, a camera ("USB 3.0 camera") 1054 such as an USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to perform location-aware tasks for captured content when physical location information for one or more capture devices is unavailable.

Figure 11:
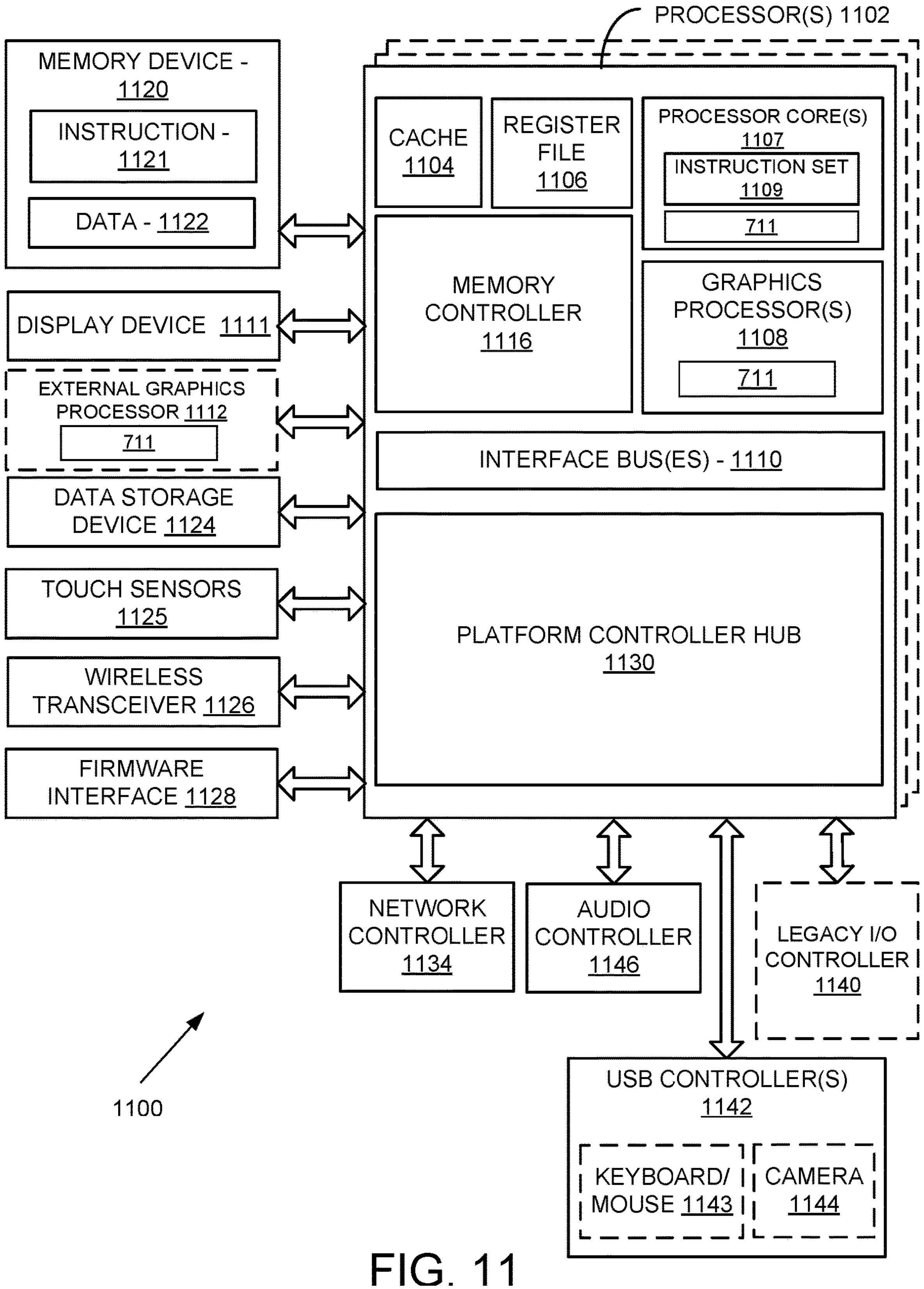
FIG. 11 illustrates at least portions of a graphics processor, according to one or more embodiments.

FIG. 11 is a block diagram of a processing system, according to at least one embodiment. In at least one embodiment, system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, system 1100 is a processing platform incorporated within a SoC integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, coupled with, or be integrated within a wearable device, such as a smart watch wearable device, smart eyewear device, AR device, or VR device. In at least one embodiment, processing system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate CISC, RISC, or computing via a VLIW. In at least one embodiment, processor core(s) 1107 may each process a different instruction set 1109, which may include instructions to facilitate emulation of other instruction sets. In at least one embodiment, processor core(s) 1107 may also include other processing devices, such a DSP.

In at least one embodiment, processor(s) 1102 includes cache memory ("cache") 1104. In at least one embodiment, processor(s) 1102 can have a single internal cache or multiple levels of internal cache. In at least one embodiment, cache memory is shared among various components of processor(s) 1102. In at least one embodiment, processor(s) 1102 also uses an external cache (for example, a Level-3 ("L3") cache or Last Level Cache ("LLC")) (not shown), which may be shared among processor core(s) 1107 using known cache coherency techniques. In at least one embodiment, register file 1106 is additionally included in processor(s) 1102 which may include different types of registers for storing different types of data (for example, integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in system 1100. In at least one embodiment, interface bus(es) 1110, in one embodiment, can be a processor bus, such as a version of a Direct Media Interface ("DMI") bus. In at least one embodiment, interface bus(es) 1110 is not limited to a DMI bus, and may include one or more Peripheral Component Interconnect buses (for example, PCI, PCI Express), memory buses, or other types of interface buses. In at least one embodiment processor(s) 1102 include an integrated memory controller 1116 and a platform controller hub ("PCH") 1130. In at least one embodiment, memory controller 1116 facilitates communication between a memory device 1120 and other components of system 1100, while PCH 1130 provides connections to I/O devices via a local I/O bus.

In at least one embodiment, memory device 1120 can be a DRAM device, a SRAM device, a flash memory device, a phase-change memory device, or some other memory device having suitable performance to serve as process memory. In at least one embodiment memory device 1120 can operate as system memory for system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (for example, DisplayPort, etc.). In at least one embodiment, display device 1111 can include a head mounted display ("HMD") such as a stereoscopic display device for use in VR applications or AR applications.

In at least one embodiment, PCH 1130 allows peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (for example, a hard disk drive, a flash memory, etc.). In at least one embodiment, data storage device 1124 can connect via a storage interface (for example, SATA) or via a peripheral bus, such as a Peripheral Component Interconnect bus (for example, PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution ("LTE") transceiver. In at least one embodiment, firmware interface 1128 allows communication with system firmware, and can be, for example, a unified extensible firmware interface ("UEFI"). In at least one embodiment, network controller 1134 can allow a network connection to a wired network. In at least one embodiment, a high-performance network controller (not shown) couples with interface bus(es) 1110. In at least one embodiment, audio controller 1146 is a multi-channel high definition audio controller. In at least one embodiment, system 1100 includes an optional legacy I/O controller 1140 for coupling legacy (for example, Personal System 2 ("PS/2")) devices to system. In at least one embodiment, PCH 1130 can also connect to one or more USB controller(s) 1142 connect input devices, such as keyboard and mouse 1143 combinations, a camera 1144, or other USB input devices.

In at least one embodiment, an instance of memory controller 1116 and PCH 1130 may be integrated into a discreet external graphics processor, such as external graphics processor 1112. In at least one embodiment, PCH 1130 and/or memory controller 1116 may be external to one or more processor(s) 1102. For example, in at least one embodiment, system 1100 can include an external memory controller 1116 and PCH 1130, which may be configured as a MCH and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALU(s) embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALU(s) of a graphics processor to perform one or more machine learning algorithms, neural network architectures, use cases, or training techniques described herein.

Such components can be used to perform location-aware tasks for captured content when physical location information for one or more capture devices is unavailable.

Figure 12:
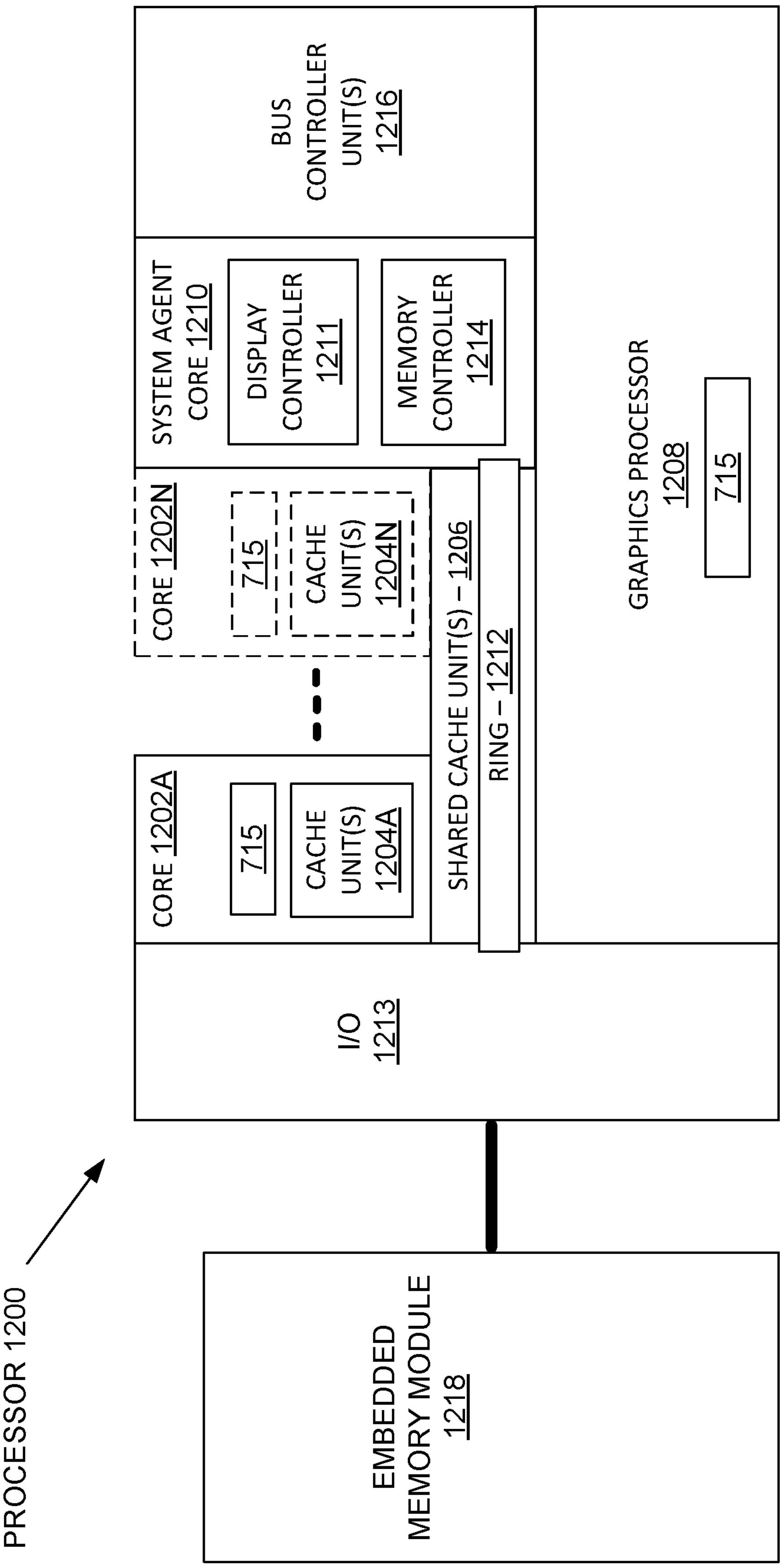
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache memory unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express buses. In at least one embodiment, system agent core 1210 provides management functionality for various processor components. In at least one embodiment, system agent core 1210 includes one or more integrated memory controller(s) 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit ("PCU"), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controller(s) 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory module 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture ("ISA"), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as a SOC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALU(s) embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALU(s) of graphics processor 1200 to perform one or more machine learning algorithms, neural network architectures, use cases, or training techniques described herein.

Such components can be used to perform location-aware tasks for captured content when physical location information for one or more capture devices is unavailable.

Virtualized Computing Platform

Figure 13:
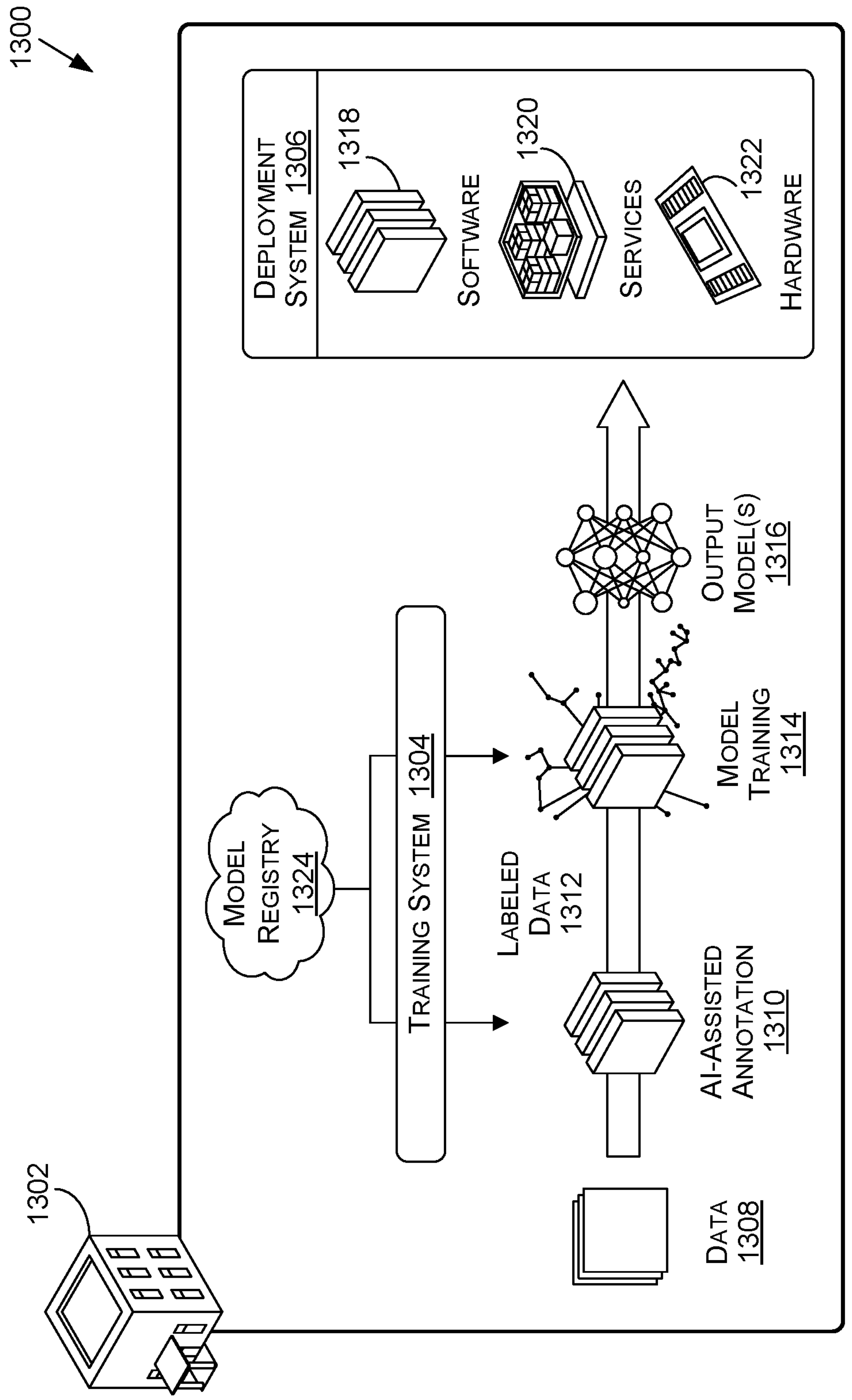
FIG. 13 is an example data flow diagram for an advanced computing pipeline, in accordance with at least one embodiment.

FIG. 13 is an example data flow diagram for a process 1300 of generating and deploying a data processing and inferencing pipeline, in accordance with at least one embodiment. In at least one embodiment, process 1300 may be deployed for use with imaging devices, processing devices, and/or other device types at one or more facility (ies) 1302. Process 1300 may be executed within a training system 1304 and/or a deployment system 1306. In at least one embodiment, training system 1304 may be used to perform training, deployment, and implementation of machine learning models (for example, neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility (ies) 1302. In at least one embodiment, one or more applications in a pipeline may use or call upon services (for example, inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility (ies) 1302 using data 1308 (such as imaging data) generated at facility (ies) 1302 (and stored on one or more picture archiving and communication system ("PACS") servers at facility (ies) 1302), may be trained using imaging or sequencing data 1308 from another facility (ies) 1302, or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface ("API") from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1304 (FIG. 13) may include a scenario where facility (ies) 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (for example, convolutional neural networks ("CNNs")) that may be trained to generate annotations corresponding to certain types of imaging data 1308 (for example, from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, a training pipeline may include a scenario where facility (ies) 1302 needs a machine learning model for use in performing one or more processing tasks for one or more applications in deployment system 1306, but facility (ies) 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility (ies) 1302 (for example, facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility (ies) 1302 requiring a machine learning model for use in performing one or more processing tasks for one or more applications in deployment system 1306, but facility (ies) 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility (ies) 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314 (for example, AI-assisted annotation 1310, labeled data 1312, or a combination thereof) may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (for example, inferencing, audio detection, feature detection, segmentation, audio enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility (ies) 1302 after processing through a pipeline (for example, to convert outputs back to a usable data type). In at least one embodiment, a combination of containers within software 1318 (for example, that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (for example, imaging data 1308) in a specific format in response to an inference request (for example, a request from a user of deployment system 1306). In at least one embodiment, input data may be representative of one or more audio, video, and/or other data representations generated by one or more devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (for example, as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (for example, limited access) area of a container registry (described in more detail herein), and trained or deployed models may be stored in model registry 1324 and associated with one or more applications. In at least one embodiment, images of applications (for example, container images) may be available in a container registry, and once selected by a user from a container registry for deployment in a pipeline, an image may be used to generate a container for an instantiation of an application for use by a user's system.

In at least one embodiment, developers (for example, software developers, clinicians, doctors, etc.) may develop, publish, and store applications (for example, as containers) for performing audio processing and/or inferencing on supplied data. In at least one embodiment, development, publishing, and/or storing may be performed using a software development kit ("SDK") associated with a system (for example, to ensure that an application and/or container developed is compliant with or compatible with a system). In at least one embodiment, an application that is developed may be tested locally (for example, at a first facility, on data from a first facility) with an SDK which may support at least some of services 1320 as a system (for example, system 1200 of FIG. 12). In at least one embodiment, because DICOM objects may contain anywhere from one to hundreds of audio or other data types, and due to a variation in data, a developer may be responsible for managing (for example, setting constructs for, building pre-processing into an application, etc.) extraction and preparation of incoming data. In at least one embodiment, once validated by system 1300 (for example, for accuracy), an application may be available in a container registry for selection and/or implementation by a user to perform one or more processing tasks with respect to data at a facility (for example, a second facility) of a user.

In at least one embodiment, developers may then share applications or containers through a network for access and use by users of a system (for example, system 1300 of FIG. 13). In at least one embodiment, completed and validated applications or containers may be stored in a container registry and associated machine learning models may be stored in model registry 1324. In at least one embodiment, a requesting entity—who provides an inference or audio processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (for example, a cloud) to perform processing of data processing pipeline. In at least one embodiment, processing by deployment system 1306 may include referencing selected elements (for example, applications, containers, models, etc.) from a container registry and/or model registry 1324. In at least one embodiment, once results are generated by a pipeline, results may be returned to a user for reference (for example, for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, AI services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (for example, using a parallel computing platform). In at least one embodiment, rather than each application that shares a same functionality offered by services 1320 being required to have a respective instance of services 1320, services 1320 may be shared between and among various applications. In at least one embodiment, services 1320 may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (for example, DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional ("2D") and/or 3D models. In at least one embodiment, virtual instrument services may be included that provide for beam-forming, segmentation, inferencing, imaging, and/or support for other applications within pipelines of virtual instruments.

In at least one embodiment, where services 1320 includes an AI service (for example, an inference service), one or more machine learning models may be executed by calling upon (for example, as an API call) an inference service (for example, an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (for example, an AI supercomputer, such as NVIDIA's DGX Systems), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (for example, at facility(ies) 1302), within an AI/deep learning system, in a cloud system, and/or in other processing components of deployment system 1306 to improve efficiency, accuracy, and efficacy of audio processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (for example, hardware and software combination of NVIDIA's DGX Systems). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (for example, NVIDIA's NGC) may be executed using an AI/deep learning supercomputer(s) and/or GPU-optimized software (for example, as provided on NVIDIA's DGX Systems) as a hardware abstraction and scaling platform. In at least one embodiment, cloud platform may integrate an application container clustering system or orchestration system (for example, KUBERNETES) on multiple GPUs to allow seamless scaling and load balancing.

Figure 14:
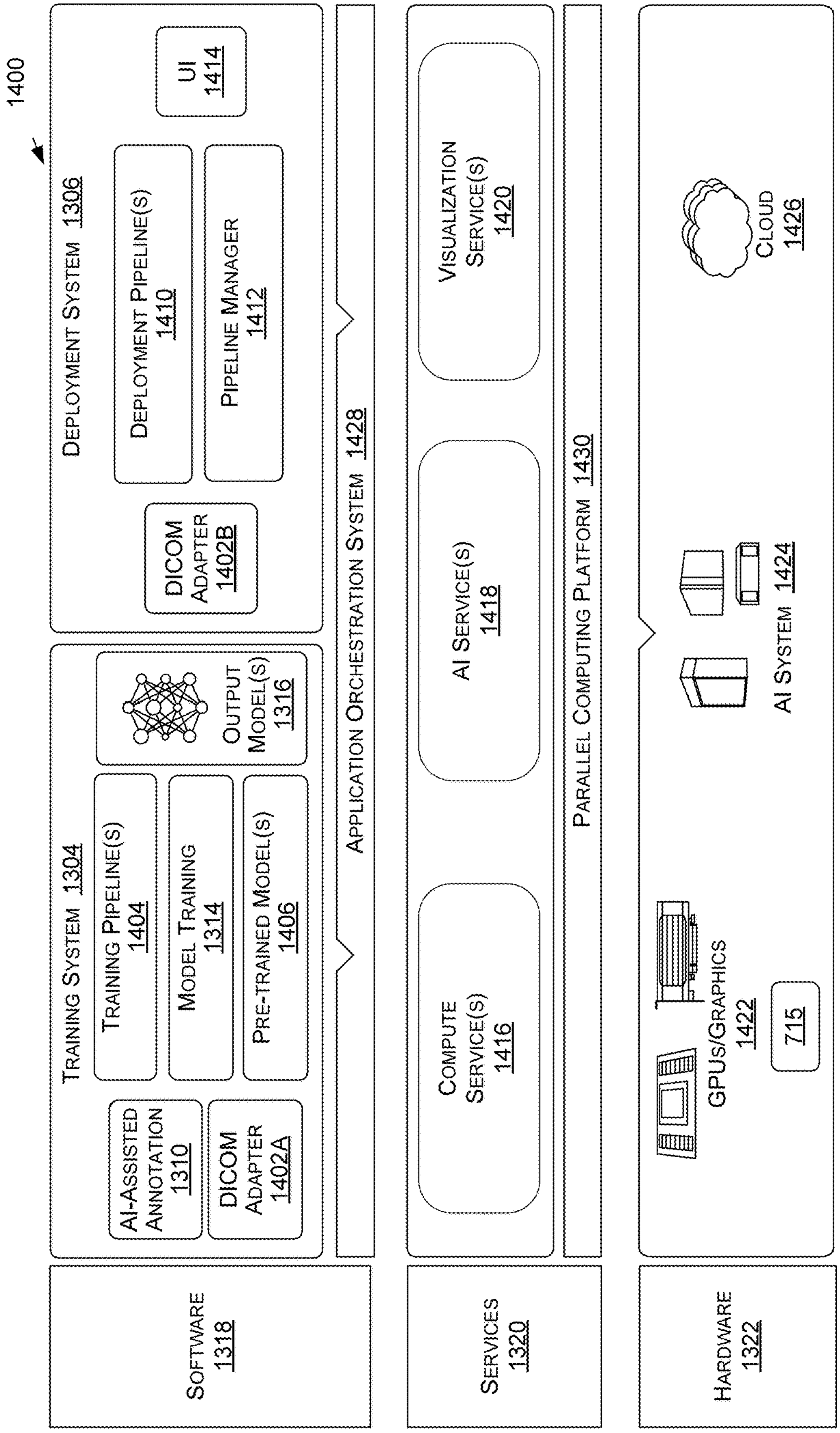
FIG. 14 is a system diagram for an example system for training, adapting, instantiating, and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (for example, training system 1304 and/or deployment system 1306) may implemented in a cloud computing environment (for example, using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (for example, AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to LANs and/or WANs via wired and/or wireless communication protocols. In at least one embodiment, communication between facilities and components of system 1400 (for example, for transmitting inference requests, for receiving results of inference requests, etc.) may be communicated over data bus (ses), wireless data protocols (Wi-Fi), wired data protocols (for example, Ethernet), etc.

In at least one embodiment, training system 1304 may execute training pipeline(s) 1404, similar to those described herein with respect to FIG. 13. In at least one embodiment, where one or more machine learning models are to be used in deployment pipeline(s) 1410 by deployment system 1306, training pipeline(s) 1404 may be used to train or retrain one or more (for example, pre-trained) models, and/or implement one or more of pre-trained model(s) 1406 (for example, without a need for retraining or updating). In at least one embodiment, as a result of training pipeline(s) 1404, output model(s) 1316 may be generated. In at least one embodiment, training pipeline(s) 1404 may include any number of processing steps, such as but not limited to imaging data (or other input data) conversion or adaption In at least one embodiment, for different machine learning models used by deployment system 1306, different training pipeline(s) 1404 may be used. In at least one embodiment, training pipeline(s) 1404 similar to a first example described with respect to FIG. 13 may be used for a first machine learning model, training pipeline(s) 1404 similar to a second example described with respect to FIG. 13 may be used for a second machine learning model, and training pipeline(s) 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines ("SVM"), Naïve Bayes, k-nearest neighbor ("Knn"), K means clustering, random forest, dimensionality reduction algorithms, gradient boosting algorithms, neural networks (for example, auto-encoders, convolutional, recurrent, perceptrons, Long/Short Term Memory ("LSTM"), Hopfield, Boltzmann, deep belief, deconvolutional, generative adversarial, liquid state machine, etc.), and/or other types of machine learning models.

In at least one embodiment, training pipeline(s) 1404 may include AI-assisted annotation, as described in more detail herein with respect to at least FIG. 14. In at least one embodiment, labeled data 1312 (for example, traditional annotation) may be generated by any number of techniques. In at least one embodiment, labels or other annotations may be generated within a drawing program (for example, an annotation program), a computer aided design ("CAD") program, a labeling program, another type of program suitable for generating annotations or labels for ground truth, and/or may be hand drawn, in some examples. In at least one embodiment, ground truth data may be synthetically produced (for example, generated from computer models or renderings), real produced (for example, designed and produced from real-world data), machine-automated (for example, using feature analysis and learning to extract features from data and then generate labels), human annotated (for example, labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation 1310 may be performed as part of deployment pipeline(s) 1410; either in addition to, or in lieu of AI-assisted annotation 1310 included in training pipeline(s) 1404. In at least one embodiment, system 1400 may include a multi-layer platform that may include a software layer (for example, software 1318) of diagnostic applications (or other application types) that may perform one or more medical diagnostic functions. In at least one embodiment, system 1400 may be communicatively coupled to (for example, via encrypted links) PACS server networks of one or more facilities. In at least one embodiment, system 1400 may be configured to access and referenced data from PACS servers to perform operations, such as training machine learning models, deploying machine learning models, audio processing, inferencing, and/or other operations.

In at least one embodiment, a software layer may be implemented as a secure, encrypted, and/or authenticated API through which applications or containers may be invoked (for example, called) from an external environment(s) (for example, facility (ies) 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline(s) 1410 for an individual device may be referred to as a virtual instrument for a device (for example, a virtual ultrasound instrument, a virtual scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an audio machine, there may be a first deployment pipeline(s) 1410, and where audio enhancement is desired from output of an audio machine, there may be a second deployment pipeline(s) 1410.

In at least one embodiment, an audio generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (for example, a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (for example, Kubernetes, DOCKER, etc.) may include a container orchestration system that may group applications into containers as logical units for coordination, management, scaling, and deployment. In at least one embodiment, by associating applications from deployment pipeline(s) 1410 (for example, a reconstruction application, a segmentation application, etc.) with individual containers, each application may execute in a self-contained environment (for example, at a kernel level) to increase speed and efficiency.

In at least one embodiment, each application and/or container (or image thereof) may be individually developed, modified, and deployed (for example, a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (for example, based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (for example, user constraints), such as quality of service (QOS), urgency of need for data outputs (for example, to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (for example, execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (for example, using a parallel computing platform 1430) for processing data through one or more of applications and/or one or more tasks of a single application, substantially simultaneously. In at least one embodiment, parallel computing platform 1430 (for example, NVIDIA's CUDA) may allow general purpose computing on GPUs ("GPGPU") (for example, GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (for example, where multiple different stages of an application or multiple applications are processing same information). In at least one embodiment, rather than making a copy of data and moving data to different locations in memory (for example, a read/write operation), same data in same location of a memory may be used for any number of processing tasks (for example, at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (for example, tasked with performing one or more processing tasks of an application). In at least one embodiment, AI service(s) 1418 may leverage AI system 1424 to execute machine learning model(s) (for example, neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (for example, a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (for example, services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (for example, for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (for example, shared storage), and/or a copy of a model may be saved to a cache. In at least one embodiment, a scheduler (for example, of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (for example, hosting an instance of an inference server) may be loaded (if not already), and a start procedure may be called. In at least one embodiment, pre-processing logic in a container may load, decode, and/or perform any additional pre-processing on incoming data (for example, using a CPU(s) and/or GPU(s)). In at least one embodiment, once data is prepared for inference, a container may perform inference as necessary on data. In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (for example, TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a SDK, and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, VR displays, AR displays, etc. In at least one embodiment, virtualized environments may be used to generate a virtual interactive display or environment (for example, a virtual environment) for interaction by users of a system (for example, doctors, nurses, radiologists, etc.). In at least one embodiment, visualization service(s) 1420 may include an internal visualizer, cinematics, and/or other rendering or image processing capabilities or functionality (for example, ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (for example, NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (for example, to execute machine learning models). In at least one embodiment, cloud 1426, AI system 1424, and/or other components of system 1400 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (for example, a supercomputer or an HPC) configured for inferencing, deep learning, machine learning, and/or other AI tasks. In at least one embodiment, AI system 1424 (for example, NVIDIA's DGX Systems) may include GPU-optimized software (for example, a software stack) that may be executed using a plurality of GPUs/Graph 1422, in addition to CPUs, RAM, storage, and/or other components, features, or functionality. In at least one embodiment, one or more AI systems 1424 may be implemented in cloud 1426 (for example, in a data center) for performing some or all of AI-based processing tasks of system 1400.

In at least one embodiment, cloud 1426 may include a GPU-accelerated infrastructure (for example, NVIDIA's NGC) that may provide a GPU-optimized platform for executing processing tasks of system 1400. In at least one embodiment, cloud 1426 may include an AI system(s) 1424 for performing one or more of AI-based tasks of system 1400 (for example, as a hardware abstraction and scaling platform). In at least one embodiment, cloud 1426 may integrate with application orchestration system 1428 leveraging multiple GPUs to allow seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (for example, executing NVIDIA's TENSOR RT), provide a parallel computing platform 1430 (for example, NVIDIA's CUDA), execute application orchestration system 1428 (for example, KUBERNETES), provide a graphics rendering API and platform (for example, for ray-tracing, 2D graphics, 3D graphics, and/or other rendering techniques to produce higher quality cinematics), and/or may provide other functionality for system 1400.

Figure 15A:
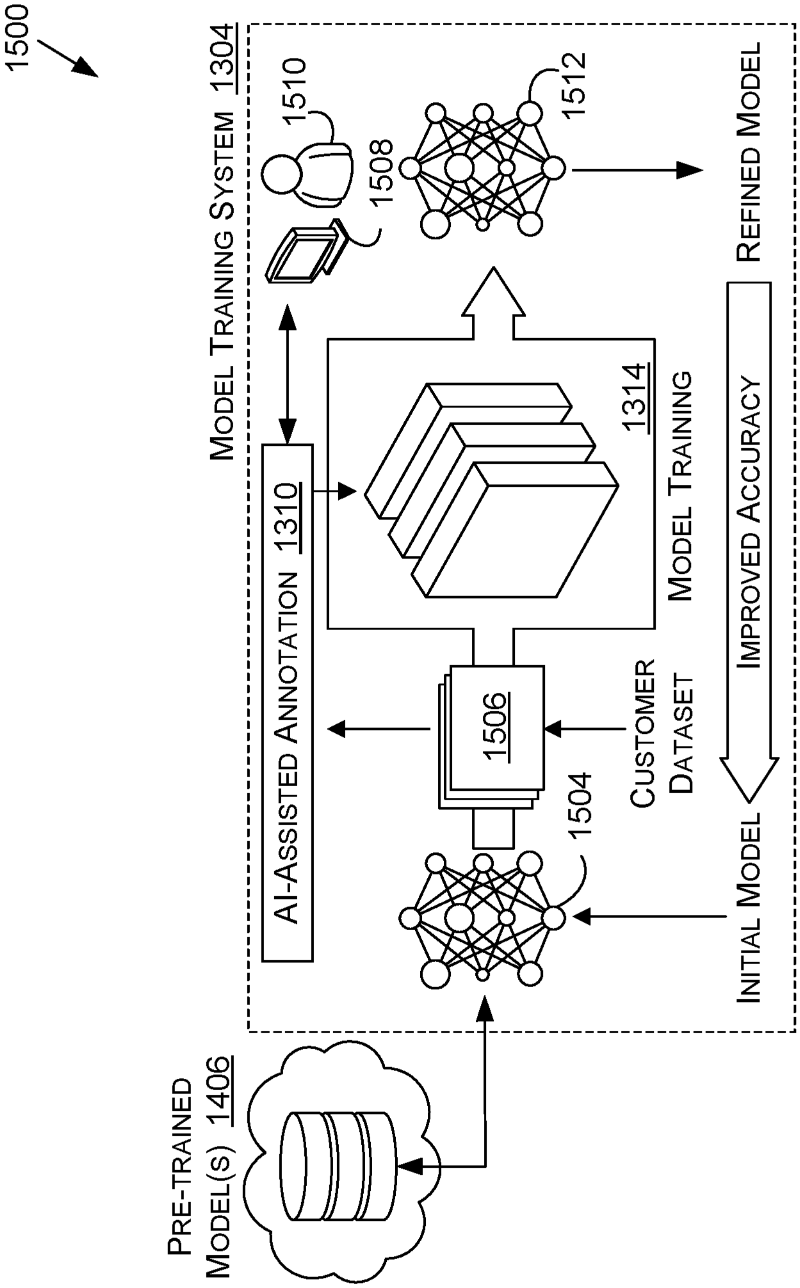
FIGS. 15A and 15B illustrate a data flow diagram for a process to train a machine learning model, as well as client-server architecture to enhance annotation tools with pre-trained annotation models, in accordance with at least one embodiment.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services and/or hardware as described herein. In at least one embodiment, refined model 1512 generated by process 1500 may be executed by a deployment system for one or more containerized applications in deployment pipelines.

In at least one embodiment, model training 1514 may include retraining or updating an initial model 1504 (for example, a pre-trained model) using new training data (for example, new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (for example, weights and/or biases) that remain from prior training, so training or retraining may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained model(s) 1406 may be stored in a data store, or registry. In at least one embodiment, pre-trained model(s) 1406 may have been trained, at least in part, at one or more facilities other than a facility executing process 1500. In at least one embodiment, to protect privacy and rights of patients, subjects, or clients of different facilities, pre-trained model(s) 1406 may have been trained, on-premise, using customer or patient data generated on-premise. In at least one embodiment, pre-trained model(s) 1406 may be trained using a cloud and/or other hardware, but confidential, privacy protected patient data may not be transferred to, used by, or accessible to any components of a cloud (or other off premise hardware). In at least one embodiment, where pre-trained model(s) 1406 is trained at using patient data from more than one facility, pre-trained model(s) 1406 may have been individually trained for each facility prior to being trained on patient or customer data from another facility. In at least one embodiment, such as where a customer or patient data has been released of privacy concerns (for example, by waiver, for experimental use, etc.), or where a customer or patient data is included in a public data set, a customer or patient data from any number of facilities may be used to train pre-trained model(s) 1406 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select pre-trained model(s) 1406 to use with an application. In at least one embodiment, pre-trained model may not be optimized for generating accurate results on customer dataset 1506 of a facility of a user (for example, based on patient diversity, demographics, types of medical devices used, etc.). In at least one embodiment, prior to deploying a pre-trained model into a deployment pipeline for use with an application(s), pre-trained model(s) 1406 may be updated, retrained, and/or fine-tuned for use at a respective facility.

In at least one embodiment, a user may select pre-trained model(s) 1406 that is to be updated, retrained, and/or fine-tuned, and this pre-trained model may be referred to as initial model 1504 for a training system within process 1500. In at least one embodiment, a customer dataset 1506 (for example, imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by model training system 1304. In at least one embodiment, ground truth data may be generated, at least in part, by clinicians, scientists, doctors, practitioners, at a facility.

In at least one embodiment, AI-assisted annotation 1310 may be used in some examples to generate ground truth data. In at least one embodiment, AI-assisted annotation 1310 (for example, implemented using an AI-assisted annotation SDK) may leverage machine learning models (for example, neural networks) to generate suggested or predicted ground truth data for a customer dataset. In at least one embodiment, a user may use annotation tools within a user interface (a GUI) on a computing device.

In at least one embodiment, user 1510 may interact with a GUI via computing device 1508 to edit or fine-tune (auto) annotations. In at least one embodiment, a polygon editing feature may be used to move vertices of a polygon to more accurate or fine-tuned locations.

In at least one embodiment, once customer dataset 1506 has associated ground truth data, ground truth data (for example, from AI-assisted annotation 1310, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical data.

In at least one embodiment, refined model 1512 may be uploaded to pre-trained model(s) 1542 in a model registry to be selected by another facility. In at least one embodiment, this process may be completed at any number of facilities such that refined model 1512 may be further refined on new datasets any number of times to generate a more universal model.

Figure 15B:
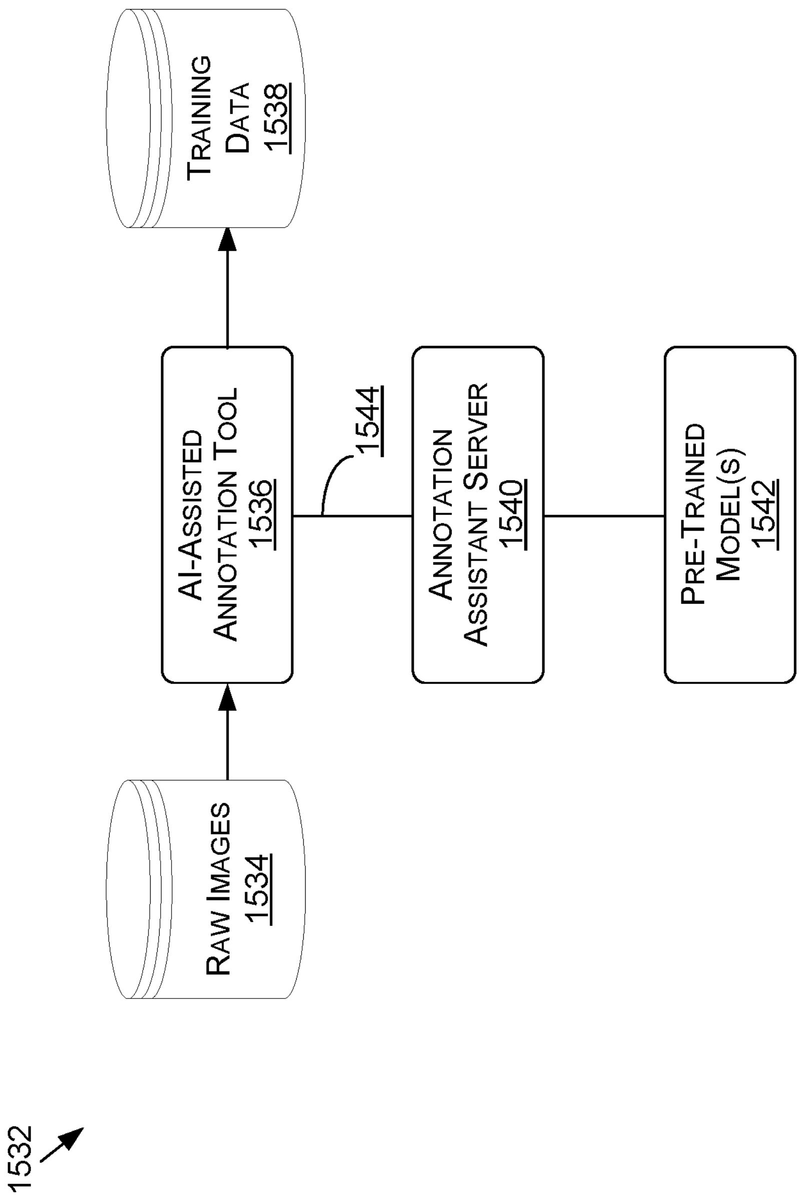

FIG. 15B is an example illustration of a client-server architecture 1532 to enhance annotation tools with pre-trained model(s) 1542, in accordance with at least one embodiment. In at least one embodiment, AI-assisted annotation tool 1536 may be instantiated based on a client-server architecture 1532. In at least one embodiment, AI-assisted annotation tools 1536 in imaging applications may aid uses, for example, identify abnormalities. In at least one embodiment, imaging applications may include software tools that help user 1510 to identify, as a non-limiting example, a few extreme points on a particular organ of interest in raw audio 1534 and receive auto-annotated results. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (for example, API Call 1544) to a server, such as an annotation assistant server 1540 that may include a set of pre-trained model(s) 1542 stored in an annotation model registry, for example. In at least one embodiment, an annotation model registry may store pre-trained model(s) 1542 (for example, machine learning models, such as deep learning models) that are pre-trained to perform AI-assisted annotation 1310 on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:
   - extracting a plurality of audio features from a plurality of audio signals captured using a plurality of microphones;
   - processing the plurality of audio features using a neural network to generate a feature vector representing a spatial location of an audio source with respect to the plurality of microphones; and
   - providing the feature vector to a task-specific model to perform, based at least on the spatial location, at least one audio-related task corresponding to the plurality of audio signals.

2. The computer-implemented method of clause 1, wherein the audio-related task includes at least one of extraction of speech corresponding to the spatial location, echo cancellation, enhancement of audio received from the spatial location associated with the audio source, or suppression of audio received from locations other than the spatial location associated with the audio source.

3. The computer-implemented method of clause 1, wherein the plurality of audio features represent differences in the plurality of audio signals corresponding to at least one of real parts or imaginary parts of a complex audio spectrum, signal magnitude, signal phase, level and time of arrival, or direct-to-reverberation ratio.

4. The computer-implemented method of clause 1, wherein the feature vector includes at least a minimum number of elements, and wherein none of the elements are required to relate to a physical direction or physical location with respect to one or more of the plurality of microphones.

5. The computer-implemented method of clause 1, further comprising:

merging the plurality of audio signals into a single audio signal before performing the at least one audio-related task.

6. The computer-implemented method of clause 1, wherein the feature vector represents a location-aware embedding of the audio source in a latent space.

7. The computer-implemented method of clause 1, wherein the plurality of audio features comprise at least one of cross-channel features, temporal features, or spectral features.

8. The computer-implemented method of clause 1, further comprising:

analyzing audio indicated to have been generated by the sound source in order to identify audio from the sound source represented in the plurality of audio signals.

9. The computer-implemented method of clause 1, wherein the processing of the plurality of audio features is performed independent of an availability of information indicating a physical configuration of the plurality of microphones.

10. A processor, comprising:

one or more circuits to:

extract a plurality of audio features from a plurality of audio signals capturing using a plurality of microphones;

process the plurality of audio features using a neural network to generate a feature vector representing a spatial location of an audio source with respect to the plurality of microphones; and provide the feature vector to a task-specific model to perform at least one audio-related task based in part on the spatial location.

11. The processor of clause 10, wherein the audio-related task includes at least one of extraction of speech corresponding to the spatial location, echo cancellation, enhancement of audio received from the spatial location associated with the audio source, or suppression of audio received from locations other than the spatial location associated with the audio source.

12. The processor of clause 10, wherein the plurality of audio features represent differences in the plurality of audio signals corresponding to at least one of real parts or imaginary parts of a complex audio spectrum, signal magnitude, signal phase, level and time of arrival, or direct-to-reverberation ratio.

13. The processor of clause 10, wherein the feature vector includes at least a minimum number of elements, and wherein none of the elements are required to relate to a physical direction or physical location with respect to one or more of the plurality of microphones.

14. The processor of clause 10, wherein the feature vector represents a location-aware embedding of the audio source in a latent space.

15. The processor of clause 10, wherein the plurality of audio features include at least one of cross-channel features, temporal features, or spectral features.

16. The processor of clause 10, wherein the processor is comprised in at least one of:

a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for performing generative content operations using a language model;
a system for synthetic data generation;
a system for performing generative AI operations using a large language model (LLM);
a collaborative content creation platform for 3D assets; or
a system implemented at least partially using cloud computing resources.

17. A system, comprising:

one or more processors to provide a feature vector to a task-specific model to perform at least one audio-related task, the feature vector generated from a plurality of audio features using a neural network and representing a spatial location of an audio source with respect to the plurality of microphones, the plurality of audio features from a plurality of audio signals captured using the plurality of microphones.

18. The system of clause 17, wherein the audio-related task includes at least one of extraction of speech corresponding to the spatial location, echo cancellation, enhancement of audio received from the spatial location associated with the audio source, or suppression of audio received from locations other than the spatial location associated with the audio source.

19. The system of clause 17, wherein the plurality of audio features represent differences in the plurality of audio signals corresponding to at least one of real or imaginary parts of a complex audio spectrum, signal magnitude, signal phase, level and time of arrival, or direct-to-reverberation ratio.

20. The system of clause 17, wherein the system comprises at least one of:

a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system for performing generative AI operations using a large language model (LLM);
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;

a system for performing generative content operations using a language model;

a system for synthetic data generation;

a collaborative content creation platform for 3D assets; or a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (for example, "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (for example, "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (for example, executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (for example, a propagating transient electric or electromagnetic transmission) but includes non-transitory data storage circuitry (for example, buffers, cache, and queues) within transceivers of transitory signals. In at least one embodiment, code (for example, executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main CPU executes some of instructions while a GPU executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (for example, "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an API or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:

extracting a plurality of audio features which represent patterns from a plurality of audio signals captured using a plurality of microphones in an unknown configuration;

processing the plurality of audio features using a neural network to generate a feature vector representing a spatial location of an audio source with respect to the plurality of microphones; and providing the feature vector to a task-specific model to perform, based at least on the spatial location, at least one audio-related task corresponding to the plurality of audio signals.

2. The computer-implemented method of claim 1, wherein the audio-related task includes at least one of extraction of speech corresponding to the spatial location, echo cancellation, enhancement of audio received from the spatial location associated with the audio source, or suppression of audio received from locations other than the spatial location associated with the audio source.

3. The computer-implemented method of claim 1, wherein the plurality of audio features represent differences, as part of the patterns, in the plurality of audio signals corresponding to at least one of real parts or imaginary parts of a complex audio spectrum, signal magnitude, signal phase, level and time of arrival, or direct-to-reverberation ratio.

4. The computer-implemented method of claim 1, wherein the feature vector includes at least a minimum number of elements, and wherein none of the elements comprise a physical direction or physical location with respect to one or more of the plurality of microphones.

5. The computer-implemented method of claim 1, further comprising:

merging the plurality of audio signals into a single audio signal before performing the at least one audio-related task.

6. The computer-implemented method of claim 1, wherein the feature vector represents a location-aware embedding of the audio source in a latent space.

7. The computer-implemented method of claim 1, wherein the plurality of audio features comprise at least one of cross-channel features, temporal features, or spectral features.

8. The computer-implemented method of claim 1, further comprising:

analyzing audio indicated to have been generated by the audio source in order to identify audio from the audio source represented in the plurality of audio signals.

9. The computer-implemented method of claim 1, wherein the processing of the plurality of audio features is performed independent of an availability of information indicating a physical configuration of the plurality of microphones.

10. A processor, comprising:

one or more circuits to:

extract a plurality of audio features, which represent patterns, from a plurality of audio signals capturing using a plurality of microphones in an unknown configuration;

process the plurality of audio features using a neural network to generate a feature vector representing a spatial location of an audio source with respect to the plurality of microphones; and provide the feature vector to a task-specific model to perform at least one audio-related task based in part on the spatial location.

11. The processor of claim 10, wherein the audio-related task includes at least one of extraction of speech corresponding to the spatial location, echo cancellation, enhancement of audio received from the spatial location associated with the audio source, or suppression of audio received from locations other than the spatial location associated with the audio source.

12. The processor of claim 10, wherein the plurality of audio features represent, as part of the patterns, differences in the plurality of audio signals corresponding to at least one of real parts or imaginary parts of a complex audio spectrum, signal magnitude, signal phase, level and time of arrival, or direct-to-reverberation ratio.

13. The processor of claim 10, wherein the feature vector includes at least a minimum number of elements, and wherein none of the elements comprise a physical direction or physical location with respect to one or more of the plurality of microphones.

14. The processor of claim 10, wherein the feature vector represents a location-aware embedding of the audio source in a latent space.

15. The processor of claim 10, wherein the plurality of audio features include at least one of cross-channel features, temporal features, or spectral features.

16. The processor of claim 10, wherein the processor is comprised in at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for performing generative content operations using a language model;

a system for synthetic data generation;

a system for performing generative AI operations using a large language model (LLM);

a collaborative content creation platform for 3D assets; or a system implemented at least partially using cloud computing resources.

17. A system, comprising:

one or more processors to provide a feature vector to a task-specific model to perform at least one audio-related task, the feature vector generated from a plurality of audio features using a neural network and representing a spatial location of an audio source with respect to a plurality of microphones in an unknown configuration, the plurality of audio features comprising patterns and from a plurality of audio signals captured using the plurality of microphones.

18. The system of claim 17, wherein the audio-related task includes at least one of extraction of speech corresponding to the spatial location, echo cancellation, enhancement of audio received from the spatial location associated with the audio source, or suppression of audio received from locations other than the spatial location associated with the audio source.

19. The system of claim 17, wherein the plurality of audio features represent, as part of the patterns, differences in the plurality of audio signals corresponding to at least one of real or imaginary parts of a complex audio spectrum, signal magnitude, signal phase, level and time of arrival, or direct-to-reverberation ratio.

20. The system of claim 17, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system for performing generative AI operations using a large language model (LLM);

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for performing generative content operations using a language model;

a system for synthetic data generation;

a collaborative content creation platform for 3D assets; or a system implemented at least partially using cloud computing resources.

* * * * *